(12) United States Patent
Yeluguri et al.

(10) Patent No.: US 11,961,017 B2
(45) Date of Patent: *Apr. 16, 2024

(54) ROOMFINDER PLATFORM

(71) Applicant: Capital One Services, LLC, McLean, VA (US)

(72) Inventors: Sneha Anand Yeluguri, Lyndhurst, NJ (US); Christopher Lanoue, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 303 days.

This patent is subject to a terminal disclaimer.

(21) Appl. No.: 16/949,736

(22) Filed: Nov. 12, 2020

(65) Prior Publication Data

US 2021/0065069 A1    Mar. 4, 2021

Related U.S. Application Data

(63) Continuation of application No. 16/552,697, filed on Aug. 27, 2019, now Pat. No. 10,860,954.

(51) Int. Cl.
*G06Q 10/02* (2012.01)
*G06F 3/0482* (2013.01)
(Continued)

(52) U.S. Cl.
CPC ........... *G06Q 10/02* (2013.01); *G06F 3/0482* (2013.01); *G06F 16/24578* (2019.01);
(Continued)

(58) Field of Classification Search
CPC . G06Q 10/02; G06F 16/24578; G06F 3/0482; G06V 20/20; G06V 30/10; G06K 9/6217
(Continued)

(56) References Cited

U.S. PATENT DOCUMENTS 10,331,970 B2    6/2019  Song et al.
2012/0066275 A1  3/2012  Gerstner et al.
(Continued)

FOREIGN PATENT DOCUMENTS

CN    105512733 A      4/2016
CN    106934471 A  *   7/2017  ............. G06Q 10/02

OTHER PUBLICATIONS

"Data Science and AI in the Travel Industry: 12 Real-Life Use Cases", Jun. 27, 2018; altexsoft.com, 20 pages (Year: 2018).*
(Continued)

*Primary Examiner* — Shannon S Campbell
*Assistant Examiner* — Freda A Nelson
(74) *Attorney, Agent, or Firm* — Harrity & Harrity, LLP

(57) ABSTRACT

A method may include receiving, from a client device, a reservation time and image data relating to a desired room; receiving, from a network storage device, facility data for a plurality of rooms; identifying, using an image recognition model, the desired room based on the image data and the facility data; determining an availability of the desired room based on the reservation time and the facility data; generating a first reservation option to reserve the desired room and/or a second reservation option to reserve an alternate room; transmitting, to the client device, the first reservation option and/or the second reservation option; receiving, from the client device, a user selection of the first reservation option and/or the second reservation option; and transmitting, to the network storage device, an instruction to reserve the desired room and/or the alternate room.

20 Claims, 10 Drawing Sheets

(51) Int. Cl.
   *G06F 16/2457* (2019.01)
   *G06F 18/21* (2023.01)
   *G06V 20/20* (2022.01)
   *G06V 30/10* (2022.01)

(52) U.S. Cl.
   CPC .............. *G06F 18/21* (2023.01); *G06V 20/20* (2022.01); *G06V 30/10* (2022.01)

(58) Field of Classification Search
   USPC .............................................. 705/5; 707/706
   See application file for complete search history.

(56) References Cited

U.S. PATENT DOCUMENTS

| | | | |
|---|---|---|---|
| 2014/0344420 | A1 | 11/2014 | Rjeili et al. |
| 2015/0178631 | A1* | 6/2015 | Thomas ................. G06N 5/047 706/12 |
| 2018/0024520 | A1 | 1/2018 | Sinha et al. |
| 2018/0101793 | A1* | 4/2018 | Steinberg ............ G06F 16/9535 |
| 2018/0204147 | A1* | 7/2018 | Koitz .................... H04L 67/306 |
| 2018/0268220 | A1 | 9/2018 | Lee et al. |
| 2018/0285820 | A1* | 10/2018 | Vendrow ............... G06Q 10/109 |
| 2019/0035009 | A1* | 1/2019 | Williams ............... G06Q 50/12 |
| 2019/0370700 | A1* | 12/2019 | Ludwig ................. G06Q 10/00 |
| 2020/0128370 | A1* | 4/2020 | Mesirow ................. G01S 5/16 |

OTHER PUBLICATIONS

Co-pending U.S. Appl. No. 16/552,697, inventor Yeluguri; Sneha Anand, filed Aug. 27, 2019.
Zhou J., et al., "Applying Visual User Interest Profiles for Recommendation and Personalisation," Springer International Publishing, 2016, pp. 361-366.

* cited by examiner

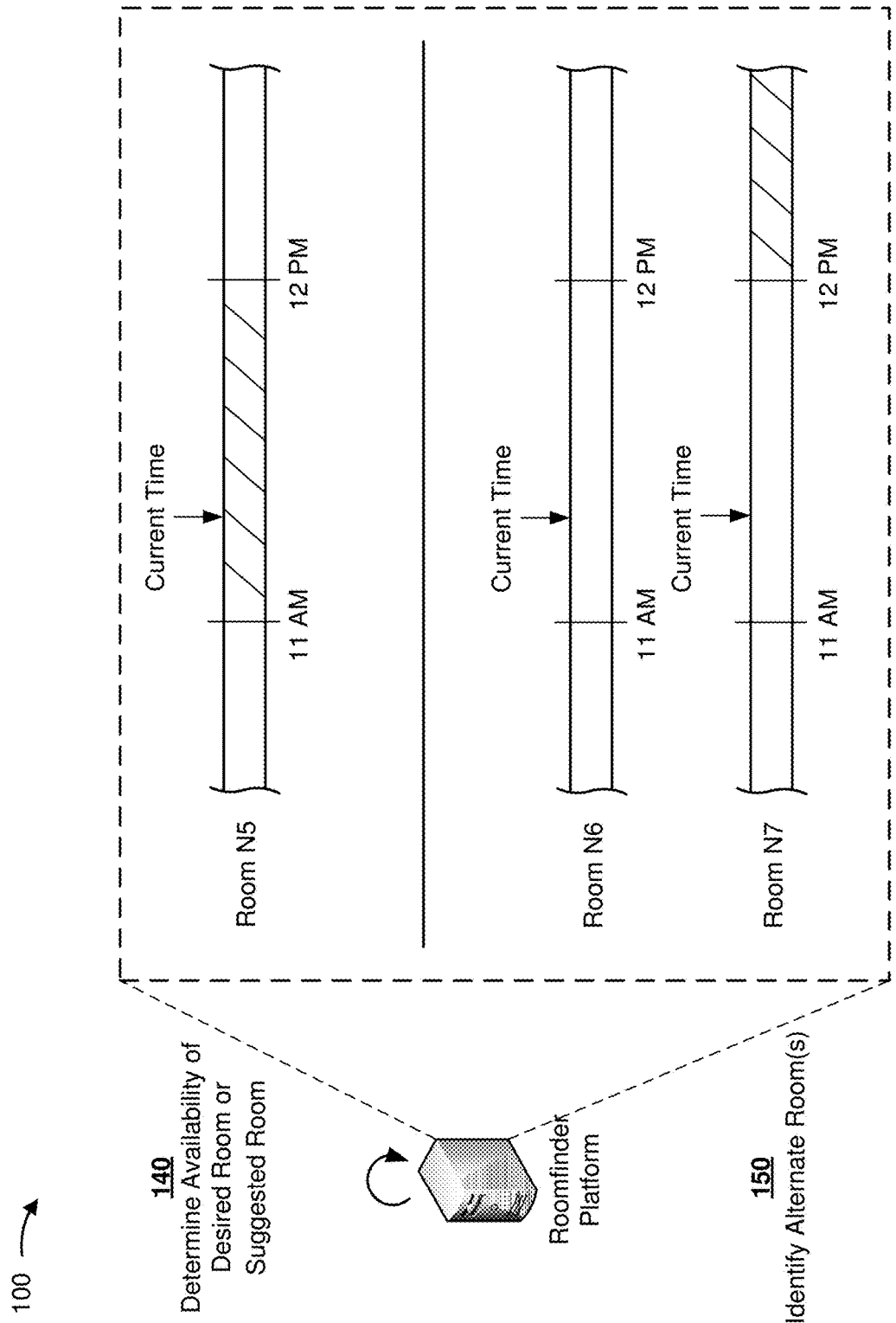

ROOMFINDER PLATFORM

RELATED APPLICATION

This application is a continuation of U.S. patent application Ser. No. 16/552,697, filed Aug. 27, 2019, which is incorporated herein by reference.

BACKGROUND

Computer vision and natural language processing are subfields of computer science, information engineering, and artificial intelligence pertaining to interactions between computers and humans and, in particular, programming computers to process and analyze large amounts of image data and natural language data. Some of the more commonly researched tasks in computer vision and natural language processing include optical character recognition (OCR), object classification, and speech recognition.

SUMMARY

According to some possible implementations, a method may include receiving, by a device and from a client device, client data relating to a reservation request. The client data may include a reservation time and image data relating to a desired room. The method may include receiving, by the device and from a network storage device, facility data for a plurality of rooms; and identifying, by the device, the desired room based on the client data and the facility data. The desired room may be identified using an image recognition model and based on the image data and the facility data. The method may include determining, by the device, an availability of the desired room based on the reservation time and the facility data; generating, by the device and based on the availability, one or more of a first reservation option to reserve the desired room or a second reservation option to reserve an alternate room; transmitting, by the device and to the client device, one or more of the first reservation option or the second reservation option; receiving, by the device and from the client device, a user selection of one of the first reservation option or the second reservation option; and transmitting, by the device and to the network storage device, an instruction to reserve one of the desired room or the alternate room based on the user selection.

According to some possible implementations, a device may include one or more memories, and one or more processors, communicatively coupled to the one or more memories. The one or more processors may receive, from a client device, a reservation request to reserve a room. The reservation request may include a reservation time. The one or more processors may receive, from a network storage device, facility data for a plurality of rooms. The facility data may include reservation information, location information, and attribute information for the plurality of rooms; and identify, using a machine learning model, one or more rooms of the plurality of rooms. The machine learning model may be trained to identify the one or more rooms based on the reservation time, the facility data, a location of the client device, and an attribute of the one or more rooms. The one or more processors may generate a reservation option to reserve one of the one or more rooms at the reservation time; transmit, to the client device, the reservation option; receive, from the client device, a user selection of the reservation option; and transmit, to the network storage device, an instruction to reserve the one of the one or more rooms based on the user selection.

According to some possible implementations, a non-transitory computer-readable medium may store one or more instructions that, when executed by one or more processors, cause the one or more processors to receive, from a client device, a reservation request to reserve a room. The reservation request may include a reservation time, a location of the client device, and a user-specified attribute. The one or more instructions may cause the one or more processors to receive, from a network storage device, facility data for a plurality of rooms. The facility data may include reservation information, location information, and attribute information for the plurality of rooms. The one or more instructions may cause the one or more processors to identify, using a machine learning model, one or more rooms of the plurality of rooms. The machine learning model may be trained to identify the one or more rooms based on the reservation time, the facility data, the location of the client device, the user-specified attribute, and an attribute of the one or more rooms. The one or more instructions may cause the one or more processors to generate a reservation option to reserve one of the one or more rooms at the reservation time; transmit, to the client device, the reservation option; receive, from the client device, a user selection of the reservation option; and transmit, to the network storage device, an instruction to reserve the one of the one or more rooms based on the user selection.

BRIEF DESCRIPTION OF THE DRAWINGS

FIGS. 1A-1E are diagrams of one or more example implementations described herein.

DETAILED DESCRIPTION

Figure 1A:
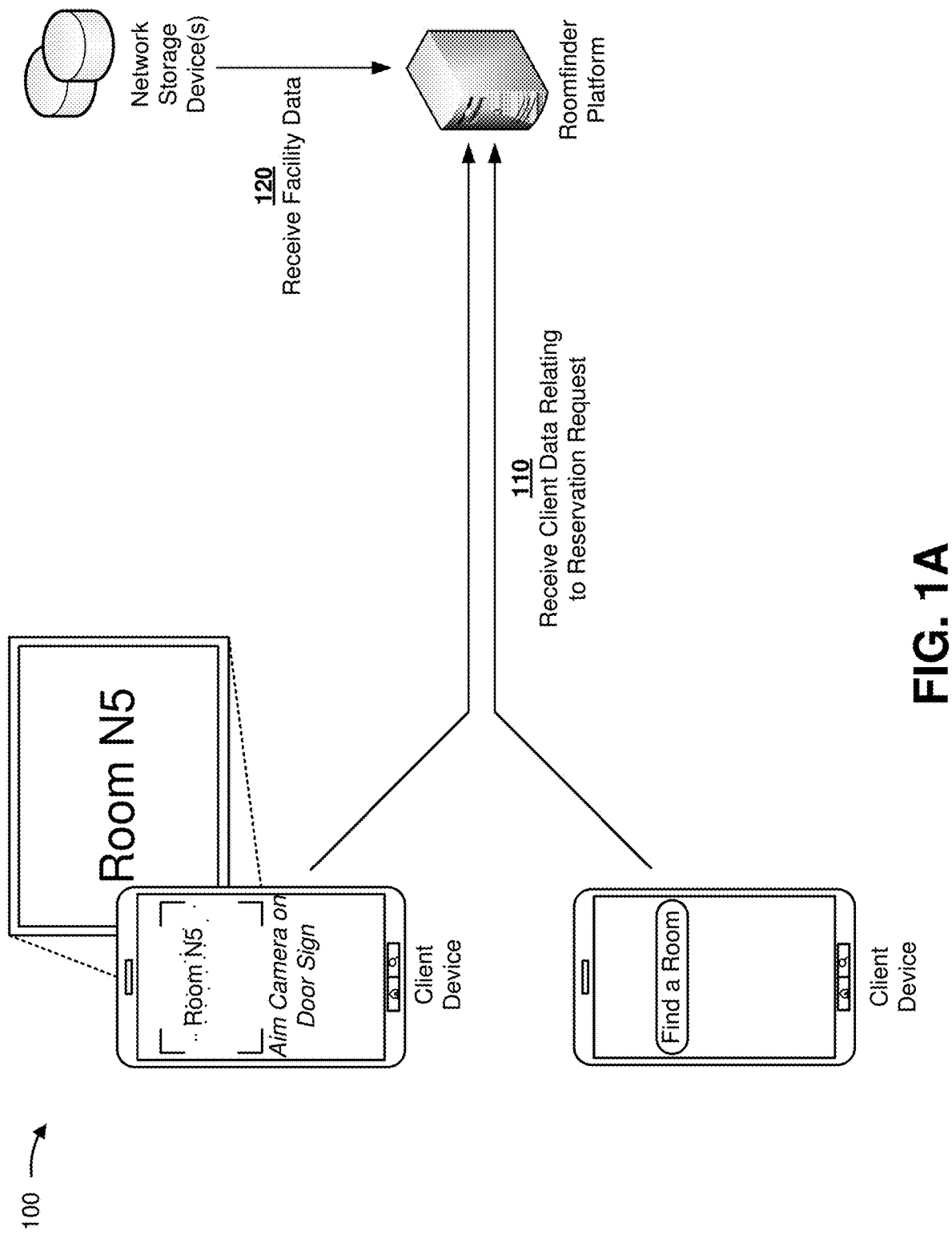

The following detailed description of example implementations refers to the accompanying drawings. The same reference numbers in different drawings may identify the same or similar elements.

An organization often relies on a network-based service (e.g., a mail service and/or a calendar service) to manage reservations of meeting rooms, conference rooms, huddle rooms, enclaves, and/or the like within an associated facility. For example, the service may assign an account (e.g., an electronic mailbox and/or an electronic calendar) to a room, and enable a client user (e.g., an employee of the organization) connected to the service to reserve the room. The process of reserving a room may be similar to the process of scheduling a meeting with an employee of the organization. The user can use a client application to search for the room (e.g., by room number, room name, and/or another room identifier used by the organization to index the room), check availability of the room for different times, and submit a request to reserve the room for a particular time. If the room is available for the requested time, and if the user has appropriate permissions to use the room, the service confirms the reservation and annotates the reservation on calendars associated with the room and the user.

In some cases, a user may need to use a room but may not have time to properly reserve the room (e.g., due to an urgent meeting, call, and/or the like). In such cases, the user may resort to using any empty room nearby. However, without knowing if the room is reserved or not, the user risks being interrupted by others who may have reserved the room. In some cases, the user may want to reserve a room nearby, but may be unfamiliar with the facility (e.g., in the case of a new employee or a visiting employee) and unsure of which room to reserve. The user may need to physically visit nearby rooms and gather room numbers or room names before being able to reserve a room. In some cases, a user may need a room nearby with a specific room attribute (e.g., room capacity, room equipment, room floor, room location, room accessibility, and/or the like), but the client application may not provide sufficient information relating to room attributes. The user may need to physically visit multiple rooms for the desired room attribute and gather room numbers or room names before being able to reserve the room.

Although currently available solutions may be adequate for some cases, there is room for improvement. For instance, the typical client application is not adequately equipped to identify rooms by location. In order to reserve a room, a user may need to first obtain room identifying information (e.g., room number, room name, and/or the like), and manually enter the room identifying information to the client application. Some organizations may separately offer an additional resource (e.g., a facility map, a directory, and/or another reference) that the user can use to manually look up room identifying information. However, using multiple resources to complete the single task of reserving a room can be inefficient and inconvenient. Also, the interface of the client application is usually complex and difficult to use via a smaller touchscreen display of a smartphone, which often limits a user to a workstation or a laptop computer to reserve a room. Such drawbacks lead to unwanted delays, and/or otherwise unnecessary use of computational and/or network resources (e.g., processing resources, memory resources, power resources, communication resources, and/or the like).

Some implementations described herein may provide a roomfinder platform that automatically identifies a desired room to be reserved, determines an availability of the desired room, and generates options for reserving the desired room or an alternate room if the desired room is unavailable. In some implementations, the roomfinder may identify a suggested room to reserve for the user when a desired room was not specified. The roomfinder platform may use a camera, a microphone, a sensor, and/or another feature of a smartphone, a tablet, a laptop computer, or another mobile device to automatically identify the desired room, the alternate room, and/or the suggested room for the user. The roomfinder platform may receive facility data to determine the availability of the desired room, the alternate room, and/or the suggested room. In some implementations, the roomfinder platform may use a machine learning model to identify the desired room, the alternate room, and/or the suggested room based on a room attribute. The roomfinder platform may generate reservation options for the user, and confirm the reservation based on the reservation option selected by the user.

In this way, the roomfinder platform provides a user with a single resource that can automatically identify a desired room, check availability of the desired room, and reserve the desired room or an alternate room based on the availability. By leveraging features already built into a smartphone or another mobile device, the roomfinder platform provides a quicker and more convenient way to reserve a room. By automatically managing several steps typically involved in reserving a room, the roomfinder platform conserves computational and/or network resources (e.g., processing resources, memory resources, power resources, communication resources, and/or the like) that would otherwise be used to reserve a room in a less efficient manner. Also, by leveraging information technology already available via facility resources, the roomfinder platform can be implemented without building or preconfiguring additional data structures, and without requiring additional infrastructure (e.g., networking hardware, software, services, resources, and/or the like) for managing such data structures. Furthermore, by acting as the sole intermediary between the user and the facility, the roomfinder can be better positioned to ensure compliance to corporate policies (e.g., restricting access to certain rooms to certain users, and/or the like).

FIGS. 1A-1E are diagrams of one or more example implementations 100 described herein. As shown in FIGS. 1A-1E, the example implementation(s) 100 may include a roomfinder platform, a client device, and a network storage device. FIGS. 1A-1E present one or more functions that may be performed by the roomfinder platform to automatically identify and reserve a room for a user. For example, the roomfinder platform may use a sensor or another input device of the client device to identify a desired room, use facility data provided by the network storage device to determine an availability of the desired room or an alternate room if the desired room is unavailable, and reserve the desired room or the alternate room based on a reservation option selected by the user, as discussed in more detail below. In some cases, one or more functions of the roomfinder platform may be performed by another device, such as the client device, the network storage device, and/or the like. Additionally, or alternatively, the roomfinder platform may be implemented by the client device, the network storage device, and/or the like.

In some implementations, the roomfinder platform may provide a roomfinder service that a plurality of users (e.g., employees of an organization, and/or the like) can access using a client application that is installed on a client device (e.g., a smartphone, a laptop computer, and/or the like). In some cases, the roomfinder service may be provided to the client device via a web-based application that is hosted by the roomfinder platform. Access to the roomfinder service may be provided to particular groups of users (e.g., employees of a particular facility of the organization, employees of a particular department of the organization, all verified employees of the organization, and/or the like). The roomfinder platform may identify individual users based on user account information (e.g., usernames, login credentials, and/or other information used by employees to access network-based services provided by the organization). In some implementations, the roomfinder platform may incorporate one or more administrative policies and/or rules of the organization, and automatically restrict access to certain rooms to certain users, and/or the like.

As shown in FIG. 1A, and by reference number 110, the roomfinder platform may receive client data from the client device relating to a reservation request. The reservation request may correspond to a request by a user of the client device to reserve a desired room (e.g., a meeting room, a conference room, a huddle room, and/or an enclave within a facility) for a requested reservation time. The client data may include data that is supported by the client device and that can be used by the roomfinder platform to fulfill the reservation request (e.g., automatically reserve the desired room for the reservation time, propose an alternate room if the desired room is unavailable for the reservation time, and/or the like). For example, the client data may include image data (e.g., corresponding to an image or a video captured via a camera of the client device), audio data (e.g., corresponding to audio captured via a microphone of the client device), and/or location data (e.g., corresponding to a geographical position detected using a geographical positioning system (GPS) sensor of the client device, an elevation detected using a barometer of the client device, and/or the like).

In some implementations, the client data may include other combinations of data that can be captured by the client device and used to derive information related to the reservation request. For example, the client data may include a combination of data from an accelerometer, a gyroscope, a barometer, a GPS sensor, and/or the like, that can be used to track movement by the user of the client device while traveling between two or more locations within the facility, track directional changes by the user while traveling between two or more locations within the facility, estimate a change in position of the user from a reference location within the facility, and/or otherwise estimate an approximate location of the client device relative to the desired room. Additionally, or alternatively, the client data may be provided in comparison to reference data (e.g., crowdsourced data corresponding to an amount of movement by other users traveling between similar locations within the facility collected from other client devices, and/or the like).

In some implementations, the client data may include the reservation time (e.g., a desired start time of the requested reservation). In some cases, the reservation time specified by the user may be immediate. In such cases, the reservation time may correspond to a time the reservation request is received (e.g., determined based on a timestamp associated with the reservation request received by the roomfinder platform, a timestamp associated with the client data received by the roomfinder platform, and/or the like). In some cases, the reservation time may be for a later time. In such cases, the reservation time may be specified by the user (e.g., input via a touchscreen, a keypad, a keyboard, a microphone, and/or another user interface of the client device). Additionally, or alternatively, the reservation time may be specified in terms of a desired duration of the requested reservation, a desired timeframe for the requested reservation, and/or the like.

In some implementations, the roomfinder platform may receive an image of an attribute of the desired room from the client device. As shown for example in FIG. 1A, the attribute may be a door sign containing a room number that is attached to a door or near an entrance of the desired room. The attribute may include a name plate, a number plate, a braille sign, a digital display, door decor, wall decor, and/or another fixture of the desired room containing alphanumeric characters, braille, a quick response (QR) code, a barcode, and/or another visible representation of a room number, a room name, and/or another room identifier. Additionally, or alternatively, the attribute may correspond to a light fixture, carpeting, flooring, furniture, equipment, door decor, wall decor, and/or another attribute of the desired room having a shape, a size, a position, an orientation, a color, a design, and/or another visible property that can be uniquely associated with the desired room.

In some implementations, the roomfinder platform may enable the user to capture the image of the attribute of the desired room using a client application that is locally installed on the client device and a camera of the client device. As shown for example in FIG. 1A, the client application may guide the user in capturing the appropriate image of the attribute. For example, the client application may provide instructions and/or feedback in the form of visual, audible, and/or haptic cues that enable the user to capture an appropriate view of the attribute. In some implementations, the client application may suggest the type of attribute to capture, and/or prompt the user to categorize the type of attribute being captured (e.g., a door sign). The client application may instruct the user when to capture the image of the attribute, instruct the user to capture multiple images of the attribute (e.g., from various angles), and/or instruct the user to capture a video of the attribute. Additionally, or alternatively, the client application may instruct the user to hover the camera over the attribute, and the client application may automatically capture one or more images of the attribute. The roomfinder platform may receive image data corresponding to one or more of the captured images, the captured video, and/or the like.

In some implementations, the roomfinder platform may enable the user to verbally provide the room number, the room name, and/or another room identifier associated with the desired room using the client application installed on the client device and a microphone of the client device. For example, the client application may prompt the user to verbally provide the reservation request when the client application is started by the user, and/or prompt the user to verbally provide another attribute of the desired room (e.g., room capacity, room equipment, room floor, room location, room accessibility, and/or the like). Audio received via the microphone of the client device may be stored on the client device for transmission to the roomfinder platform. Correspondingly, the roomfinder platform may receive audio data corresponding to the audio stored on the client device.

In some implementations, the roomfinder platform may receive location data from the client device corresponding to the location of the client device. The location data may include a geographical position of the client device (e.g., determined via a GPS sensor and/or another location sensor of the client device), which may be used to determine a horizontal location of the client device relative to the facility. In some implementations, the location data may include an elevation of the client device (e.g., determined via a barometer of the client device), which may be used to estimate a vertical location of the client device relative to the facility (e.g., a floor of the facility). The location data may correspond to the location of the client device at a time the user starts the client application, at a time the user captures an image of an attribute of the desired room, at a time the user verbally provides the reservation request, and/or a time the user submits the reservation request. Additionally, or alternatively, the image data and/or the audio data may be geotagged with the location of the client device at the time the image data and/or the audio data was created.

In some implementations, the roomfinder platform may receive client data from the client device relating to a general reservation request (e.g., when no desired room was specified). As shown for example in FIG. 1A, the client application may enable the user to submit the reservation request to the roomfinder platform (e.g., to find and reserve any available room for the reservation time) rather than specifying a particular desired room as in previous examples. The client application may prompt the user for the instruction to transmit the reservation request to the roomfinder platform, or automatically transmit the reservation request to the roomfinder when the client application is started by the user. The client data may automatically include data that is readily available on the client device at the time of the reservation request so as not to require additional input from the user. For example, the client data may include the reservation time (e.g., the time associated with the reservation request) and/or the location data (e.g., the location of the client device at the time of the reservation request), which may be used to automatically fulfill the reservation request unless otherwise specified by the user.

In some implementations, the client data may include a user-specified attribute (e.g., room capacity, room equipment, room floor, room location, room layout, room accessibility, and/or the like) that the user may prefer the room to have. The roomfinder platform may receive the user-specified attribute in the form of textual data (e.g., directly input by the user using an input device of the client device). Additionally, or alternatively, the roomfinder platform may receive the user-specified attribute in the form of image data, audio data, and/or location data as in previous examples. In some implementations, the roomfinder platform may receive the user-specified attribute in the form of data relating to a past reservation by the user that may be stored on the client device, the network storage device, and/or the roomfinder platform. For example, the roomfinder platform may interpret an attribute of a room previously reserved by the user as a preference to use in fulfilling the reservation request unless otherwise specified by the user.

As further shown in FIG. 1A, and by reference number 120, the roomfinder platform may receive facility data from the network storage device. The facility data may include reservation information, location information, and/or attribute information for a plurality of rooms within a facility. For example, the facility data may include information relating to a map of the facility, a directory of rooms or other resources within the facility, and/or other reference information that can be used to identify individual rooms within the facility. The facility data may include an index of room numbers, room names, and/or other room identifiers corresponding to the rooms. In some implementations, the facility data may include information relating to one or more attributes of one or more of the rooms (e.g., corresponding to room capacity, room equipment, room floor, room location, room accessibility, and/or the like). Additionally, or alternatively, the facility data may include information relating to a mail service and/or a calendar service used to manage room reservations.

In some implementations, the facility data may include user account information for a plurality of users or personnel associated with the facility, information relating to past or current room reservations by the users or personnel, and/or the like. The network storage device may be managed by one or more organizations associated with the facility (e.g., an employer of the user, a resource management department of the organization, a property management company, and/or the like). In some implementations, certain aspects of the network storage device may be managed by the roomfinder platform. The roomfinder platform may reference the network storage device intermittently (e.g., to receive facility data when a reservation request is made). Additionally, or alternatively, the roomfinder platform may reference the network storage device periodically or continuously (e.g., to receive the facility data or updates to previously received facility data).

Figure 1B:
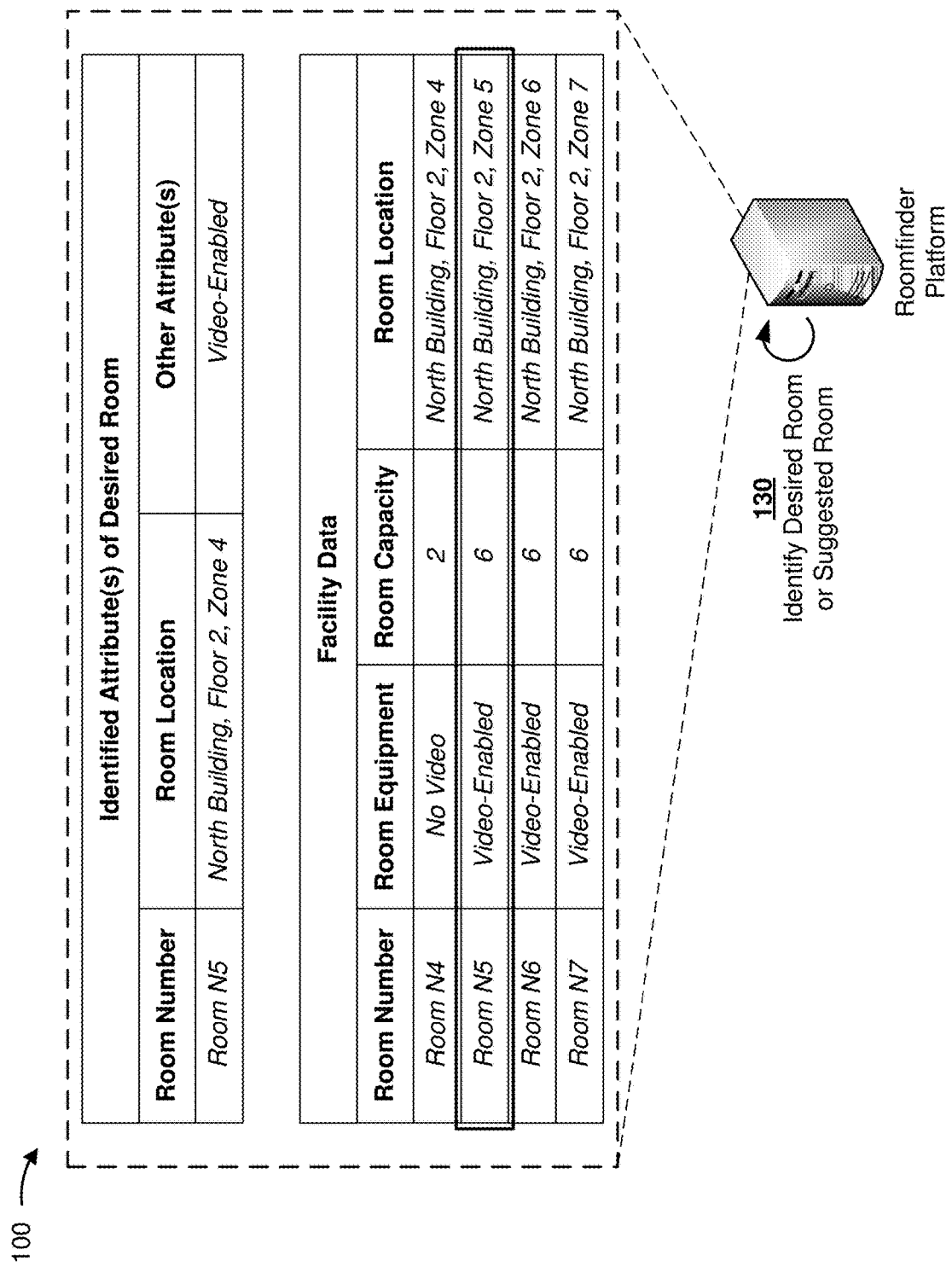

As shown in FIG. 1B, and by reference number 130, the roomfinder platform may identify a desired room based on the client data and the facility data. In some implementations, such as when a particular desired room was specified by the user, the roomfinder platform may analyze the client data to identify the desired room from the plurality of rooms of the facility data. For example, if the client data includes image data (e.g., corresponding to an image of a sign containing a room number, a room name, and/or another room identifier of the desired room in alphanumeric and/or braille form), the roomfinder platform may use an image recognition model that is trained (e.g., using optical character recognition (OCR) and/or the like) to detect a graphical pattern in the image, associate the graphical pattern with the room number, the room name, and/or another room identifier, and identify the desired room from the plurality of rooms of the facility data based on the room number, the room name, and/or another room identifier. If the image corresponds to a door sign containing a room number as shown for example in FIG. 1A, the image recognition model may use OCR to recognize the characters of the door sign (e.g., as room number "Room N5").

In some implementations, the image recognition model may be trained (e.g., using a QR decoder, a barcode decoder, and/or the like) to detect a graphical pattern in the image, associate the graphical pattern with a preconfigured code, query the preconfigured code using an index (e.g., an index associating different preconfigured codes with different rooms within the facility), and identify the desired room based on the query. In some implementations, the image recognition model may be trained (e.g., using object classification, computer vision, and/or the like) to detect room attributes within the image (e.g., a light fixture, carpeting, flooring, furniture, equipment, door decor, wall decor, and/or the like) that can be uniquely associated with one of the plurality of rooms of the facility data. For example, the image recognition model may be able to detect a graphical pattern in the image, associate the graphical pattern with a room attribute, query the room attribute using an index (e.g., an index associating different room attributes with different rooms), and identify the desired room data based on the query.

In some implementations, the image recognition model may be trained to automatically categorize one or more contents of the image and determine the appropriate image recognition technique to use (e.g., OCR, QR decoder, barcode decoder, object classification, computer vision, and/or the like). For example, the image recognition model may detect a general pattern in the image to preliminarily categorize the attribute (e.g., as alphanumeric characters, braille, a QR code, a barcode, and/or a room attribute), and use the corresponding image recognition technique to identify the desired room. In some cases, one or more contents of the image may already be categorized (e.g., by the user at the time the image was captured). In such cases, the image recognition model may use the image recognition technique corresponding to the categorization provided by the user to identify the desired room. In some implementations, the image recognition model may use all available image recognition techniques successively or simultaneously, without categorizing the contents of the image, until the desired room is identified.

In some implementations, the image recognition model may be provided within the roomfinder platform and trained to use image data received from the client device to identify the desired room. In some cases, one or more aspects of the image recognition model may be provided within the client device and trained to use local image data stored on the client device to identify the desired room. The image recognition model may be trained by the roomfinder platform, the client device, and/or the network storage device. In some implementations, another device (e.g., a server device, a cloud computing device, and/or the like) may train the image recognition model and provide the trained image recognition model for use by the roomfinder platform and/or the client device. Additionally, or alternatively, the roomfinder platform may train the image recognition model for use by another device (e.g., a server device, a cloud computing device, and/or the like).

In some implementations, the roomfinder platform may identify a desired room based on audio data received from the client device. The audio data may include audio provided by the user recorded via a microphone of the client device corresponding to a room number, a room name, and/or another room identifier associated with the desired room (e.g., "reserve Room N5"). The roomfinder platform may use a speech recognition model that is trained to detect an audio signal pattern in the audio, associate the audio signal pattern with a room number, a room name, and/or another room identifier (e.g., Room N5), and identify the desired room from the plurality of rooms of the facility data based on the room number, the room name, and/or the room identifier. In some cases, the speech recognition model may refer to an index or a library associating different audio signal patterns to common words related to reserving a room (e.g., room numbers, room names, and/or other room identifiers) that are specific to the facility.

In some implementations, the audio data may include information relating to an attribute of the desired room (e.g., room capacity, room equipment, room floor, room location, room accessibility, and/or the like). For example, the audio data may correspond to audio provided by the user specifying the attribute (e.g., "reserve the room in Zone 5 that is video-enabled" or "reserve the room with the picture of the blue flowers"). The roomfinder platform may use the speech recognition model to identify the desired room based on the audio. For example, the speech recognition model may be trained to detect an audio signal pattern in the audio, associate the audio signal pattern with a room attribute (e.g., Zone 5 and video-enabled), and identify one or more rooms from the plurality of rooms of the facility data having the room attribute (e.g., Room N5). In some cases, the speech recognition model may refer to an index or a library associating audio signal patterns to common words related to room attributes (e.g., room capacity, room equipment, room floor, room location, room accessibility, and/or the like) that are specific to the facility.

In some implementations, the speech recognition model may be provided within the roomfinder platform and trained to use audio data received from the client device to identify the desired room. In some cases, one or more aspects of the speech recognition model may be provided within the client device and trained to use audio data locally stored on the client device to identify the desired room. The speech recognition model may be trained by the roomfinder platform, the client device, and/or the network storage device. In some implementations, another device (e.g., a server device, a cloud computing device, and/or the like) may train the speech recognition model and provide the trained speech recognition model for use by the roomfinder platform and/or the client device. Additionally, or alternatively, the roomfinder platform may train the speech recognition model for use by another device (e.g., a server device, a cloud computing device, and/or the like).

In some implementations, the roomfinder platform may identify a desired room based on location data received from the client device. The location data may correspond to a geographical position of the client device relative to the facility (e.g., as detected using a GPS sensor and/or the like) and/or an elevation of the client device (e.g., as detected using a barometer and/or the like). The facility data may include an index that associates different sets of geographical coordinates to different rooms within the facility, and/or an index that associates different elevations or altitudes to different floors of the facility. For example, based on the location data, the roomfinder platform may determine that the client device is located near Zone 5 and on Floor 2 of the facility. Assuming the location of the client device corresponds to the location of the desired room, the roomfinder platform may identify Room N5 as the desired room. In some cases, the location data may be included with one or more of available image data or audio data, and/or specified by the user.

In some implementations, such as when a desired room was not specified by the user, the roomfinder platform may identify a suggested room for the user based on the available client data and the facility data (e.g., reservation information, location information, and/or attribute information). The roomfinder platform may identify the suggested room based on the location of the client device (e.g., at the time the reservation request was received) and/or a user-specified attribute (e.g., room capacity, room equipment, room floor, room location, room accessibility, and/or the like). As described above, the roomfinder platform may use the location of the client device as the preferred room location unless otherwise specified by the user. For example, the roomfinder platform may use the location of the client device and an index included in the facility data to identify the suggested room as the room located nearest to the client device. As also described above, if a user-specified attribute is provided, the roomfinder platform may refer to the facility data to identify the room having the user-specified attribute as the suggested room.

In some implementations, the roomfinder platform may use a machine learning model to identify a suggested room. The machine learning model may be trained to identify the suggested room based on one or more past reservations made by the user. For example, the machine learning model may be trained to identify the suggested room based on a room previously and/or frequently reserved by the user, and/or a room having a common attribute with a room previously and/or frequently reserved by the user. In some implementations, the machine learning model may be trained to identify the suggested room based on a score (e.g., a percentage value, a numeric index, a letter grade, and/or the like) indicative of a potential for the suggested room to satisfy the reservation request. For example, the machine learning model may be trained to determine scores for the plurality of rooms based on a proximity to the location of the client device, a past reservation, and/or a user-specified attribute. In some cases, the machine learning model may be trained to identify the room having the highest score as the suggested room. In some cases, the machine learning model may be trained to determine respective scores for the plurality of rooms of the facility data and identify a plurality of suggested rooms ranked according to the respective scores.

In some implementations, the machine learning model may be provided within the roomfinder platform and trained to use client data from the client device and the facility data from the network storage device to identify the suggested room. In some cases, one or more aspects of the machine learning model may be provided within the client device and/or the network storage device. The machine learning model may be trained by the roomfinder platform, the client device, and/or the network storage device. In some implementations, another device (e.g., a server device, a cloud computing device, and/or the like) may train the machine learning model and provide the trained machine learning model for use by the roomfinder platform, the client device, and/or the network storage device. In some cases, the roomfinder platform may train the machine learning model for use by another device (e.g., a server device, a cloud computing device, and/or the like).

As shown in FIG. 1C, and by reference number 140, the roomfinder platform may determine an availability of the identified room based on the reservation time and the facility data (e.g., reservation information indicating one or more reservations for a plurality of rooms within the facility). In some implementations, such as when a desired room was specified by the user, the roomfinder platform may determine the reservation information of the desired room at the reservation time to determine availability. As shown for example in FIG. 1C, if the reservation time is immediate, the roomfinder platform may determine the reservation information of the desired room at a time the reservation request was received (e.g., the current time). If no other reservation exists for the desired room at the reservation time, the roomfinder platform may determine that the desired room is available. If another reservation exists for the desired room at the reservation time, the roomfinder platform may determine that the desired room is unavailable.

In some implementations, the roomfinder platform may determine availability of a desired room based on whether the suggested room is available for a particular timeframe (e.g., 30 minutes, 1 hour, or the like) after the reservation time. The roomfinder platform may indicate to the user (e.g., via the client device) whether the desired room is available or unavailable, and/or provide an option to confirm or edit the reservation request. In some implementations, the roomfinder platform may determine availability of the desired room based on one or more administrative policies and/or rules of the organization that may be incorporated into the roomfinder platform and/or otherwise provided by the facility data. For example, the roomfinder platform may query user account information associated with the user and/or an authorization level associated with the desired room to verify whether the user is authorized to use or reserve the desired room. The roomfinder platform may deny access to an otherwise available desired room if the user does not have authorization to use the desired room.

In some implementations, such as when a desired room was not specified by the user, the roomfinder platform may similarly determine the availability of a suggested room identified for the user. For example, the roomfinder platform may determine the availability of the suggested room based on the reservation time (e.g., the time the reservation request was received, a time specified by the user, and/or the like) and the facility data (e.g., reservation information indicating one or more reservations for a plurality of rooms within the facility). If a particular suggested room is determined to be unavailable, the roomfinder platform may automatically identify a second suggested room and similarly determine the availability of the second suggested room. In some cases, the roomfinder platform may confirm availability of a room before identifying the room as the suggested room.

As further shown in FIG. 1C, and by reference number 150, the roomfinder platform may identify an alternate room if the desired room is unavailable. Similar to identifying a suggested room as discussed above, the roomfinder platform may identify the alternate room based on the client data, the facility data, and/or other information previously used to identify the desired room. In some implementations, the roomfinder platform may identify the alternate room based on the location of the client device (e.g., at the time the reservation request was received, a time specified by the user, and/or the like), reservation information, location information, and/or attribute information. In some cases, the alternate room may be identified as a room having a common attribute with the desired room. As shown for example in FIG. 1C, the roomfinder platform may identify one or more alternate rooms (e.g., Room N6 and Room N7) that are proximate to the desired room (e.g., Room N5), available for the reservation time (e.g., no reservations at the current time), and have common attributes with the desired room (e.g., video-enabled and a room capacity of 6).

In some implementations, the roomfinder platform may use a machine learning model to identify the alternate room. For example, the machine learning model may be trained to identify the alternate room from the plurality of rooms based on an availability for the reservation time, a proximity to the location of the client device, and/or a proximity to the location of the desired room. In some implementations, the machine learning model may be trained to identify the alternate room based on a common attribute with the desired room (e.g., in terms of room capacity, room equipment, room floor, room location, room layout, and/or room accessibility). Additionally, or alternatively, the machine learning model may be trained to identify the alternate room based on one or more past reservations made by the user (e.g., via available information from the client device and/or the facility data). For example, the machine learning model may be trained to identify a room previously and/or frequently reserved by the user as the alternate room. In some cases, the machine learning model may be trained to identify a room having a common attribute with a room previously and/or frequently reserved by the user as the alternate room.

In some implementations, the roomfinder platform may use the machine learning model to identify the alternate room based on a score (e.g., a percentage value, a numeric index, a letter grade, and/or the like) indicative of a potential for the alternate room to satisfy the reservation request. For example, the machine learning model may be trained to determine scores for the plurality of rooms based on a proximity to the location of the client device, a proximity to the location of the desired room, a common attribute with the desired room, a common attribute with a room previously and/or frequently reserved by the user, and/or a user-specified attribute. In some cases, the machine learning model may be trained to identify the room having the highest score as the alternate room. In some cases, the machine learning model may determine respective scores for the plurality of rooms of the facility data and identify a plurality of alternate rooms ranked according to the respective scores.

In some implementations, the machine learning model may be provided within the roomfinder platform and trained to use client data from the client device and the facility data from the network storage device to identify the alternate room. In some cases, one or more aspects of the machine learning model may be provided within the client device and/or the network storage device. The machine learning model may be trained by the roomfinder platform, the client device, and/or the network storage device. In some cases, another device (e.g., a server device, a cloud computing device, and/or the like) may train the machine learning model and provide the trained machine learning model for use by the roomfinder platform, the client device, and/or the network storage device. In some implementations, the roomfinder platform may train the machine learning model for use by another device (e.g., a server device, a cloud computing device, and/or the like).

Figure 1D:
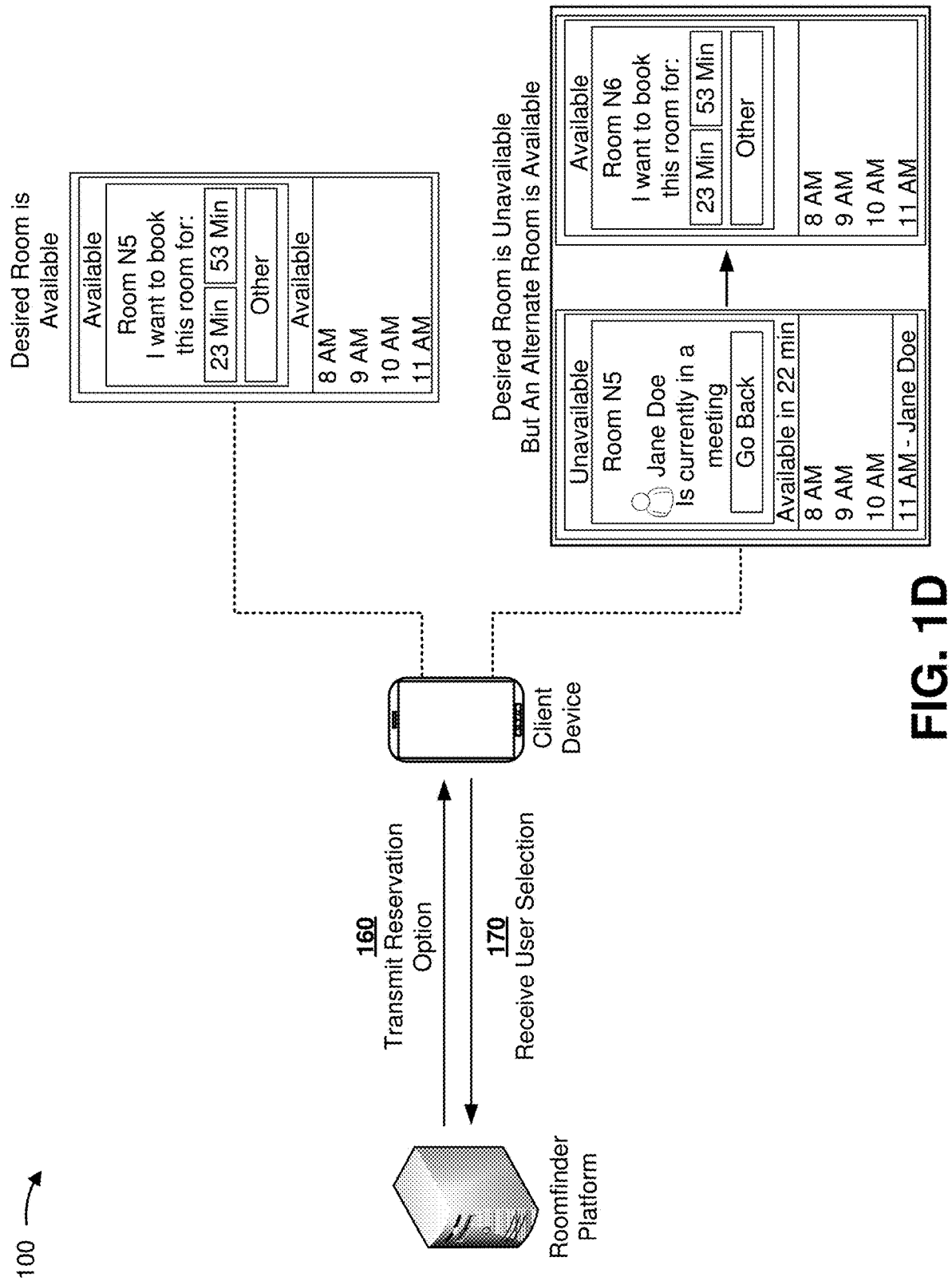

As shown in FIG. 1D, and by reference number 160, the roomfinder platform may generate a reservation option based on the availability of the desired room and transmit the reservation option to the client device. In some implementations, if the desired room is available for the reservation time, the reservation option may provide one or more preset durations that the user may select to immediately reserve the desired room for the desired duration. As shown for example in FIG. 1D, the preset durations may be dynamically calculated based on the reservation time (e.g., the current time) and until the next half-hour period (e.g., for the next 23 minutes), until the next hour (e.g., for the next 53 minutes), and/or for another duration the desired room remains available. In some cases, the preset durations may correspond to static durations (e.g., for the next 30 minutes, for the next hour, and/or for another duration the desired room remains available). Additionally, or alternatively, the reservation option may enable the user to select a different reservation time and/or a different duration.

In some implementations, if the desired room is unavailable for the reservation time, the roomfinder platform may generate a reservation option to reserve an alternate room in case the user is unable to wait for the desired room. As shown for example in FIG. 1D and as described above, the reservation option may provide one or more preset durations the user may select to immediately reserve the alternate room. For example, the reservation option may enable the user to reserve the alternate room until the next half-hour period (e.g., for the next 23 minutes), until the next hour (e.g., for the next 53 minutes), and/or for another duration the alternate room remains available. In some cases, the roomfinder platform may generate a plurality of reservation options for a plurality of alternate rooms that are available for the reservation time. In some cases, the roomfinder platform may generate a reservation option that enables the user to reserve the desired room at the next availability. For example, the reservation option may indicate when the desired room will be available (e.g., in 22 minutes) and enable the user to reserve the desired room for that time.

In some implementations, such as when a desired room was not specified by the user, the roomfinder platform may generate a reservation option to reserve a suggested room that is available for the reservation time and transmit the reservation option to the client device. If the reservation time specified by the user is immediate, the reservation option may provide one or more preset durations that the user may select to immediately reserve the suggested room. Similar to the reservation options described above, the reservation option for the suggested room may enable the user to reserve the suggested room until the next half-hour period, until the next hour, and/or for another duration the suggested room remains available. If the reservation time specified by the user is for a later time, the reservation option may enable the user to select from one or more static preset durations (e.g. for 30 minutes, for an hour, and/or the like). In some cases, the roomfinder platform may generate a plurality of reservation options for a plurality of suggested rooms that are available for the reservation time.

In some implementations, the roomfinder platform may generate and transmit a plurality of reservation options corresponding to a plurality of rooms (e.g., a plurality of alternate rooms, a plurality of suggested rooms, and/or the like). For example, the plurality of rooms may be determined to be available for the reservation time, proximate to the location of the client device, proximate to the location of a desired room if one was specified, and/or having a user-specified attribute if one was specified. In some cases, the roomfinder platform may generate the plurality of reservation options to be presented as a list. In some implementations, each of the reservation options may be ranked according to a score of the respective room (e.g., indicative of a potential for the room to satisfy the reservation request as described above). For example, the plurality of reservation options may be presented with corresponding scores (e.g., shown as percentage values, numeric indices, letter grades, and/or the like) and sorted to list the reservation options with the highest scores first.

As further shown in FIG. 1D, and by reference number 170, the roomfinder platform may receive a user selection from the client device. For example, if a desired room was specified by the user and if the desired room was available for the reservation time, the user selection may correspond to a request to reserve the desired room at the reservation time for a duration specified by the user. If a desired room was specified by the user, but the desired room was unavailable for the reservation time (e.g., the current time), the user selection may correspond to a request to immediately reserve an alternate room for a duration specified by the user, or a request to reserve the desired room when it becomes available for a duration specified by the user. In some implementations, such as when a desired room was not specified by the user, the user selection may correspond to a request to reserve a suggested room at the reservation time for a duration specified by the user. In some cases, the user selection may include another type of request (e.g., a request to select a different reservation time, to select a different duration, to search for another room, and/or the like).

Figure 1E:
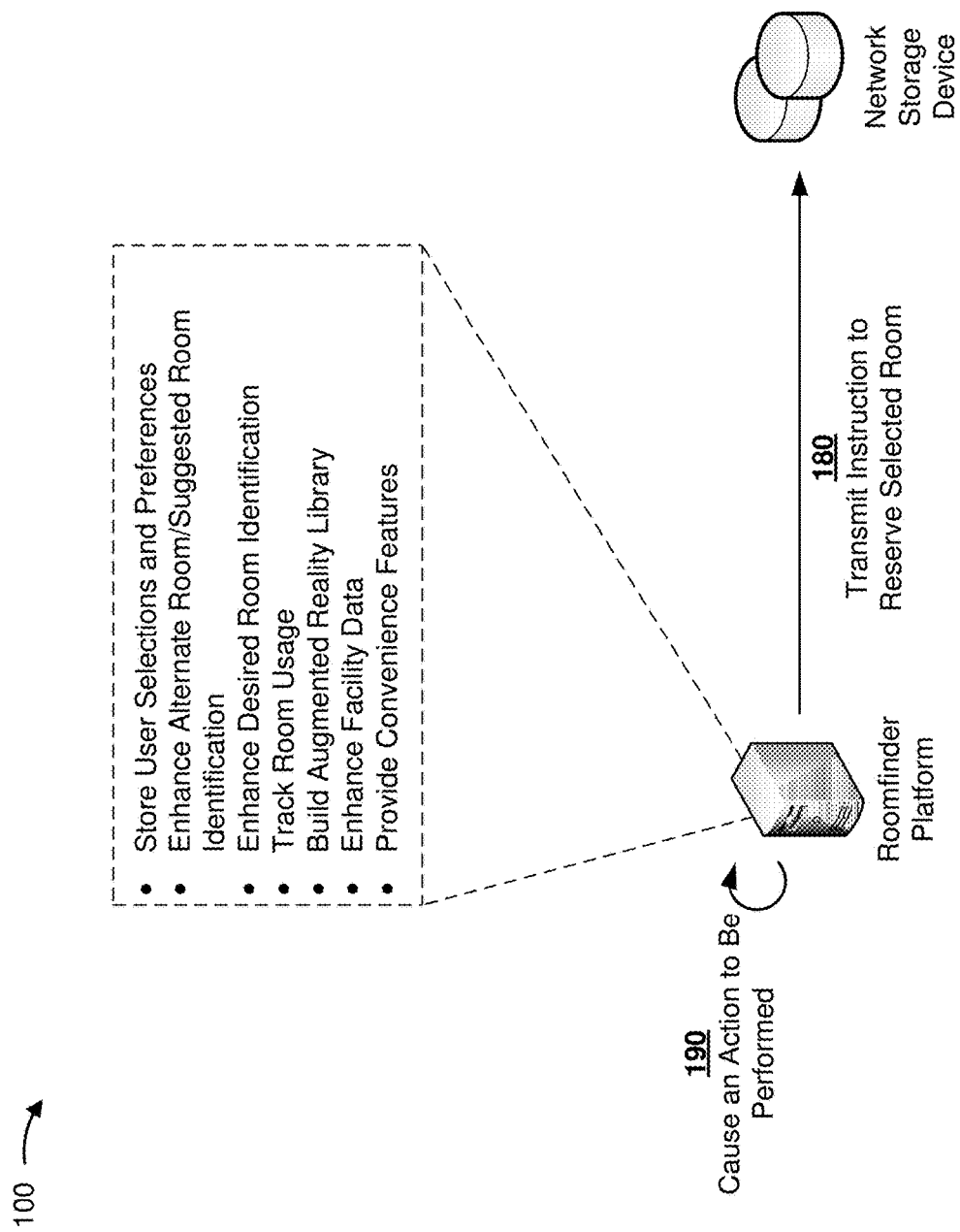

As shown in FIG. 1E, and by reference number 180, the roomfinder platform may transmit an instruction to the network storage device to reserve a room selected by the user. For example, the instruction may include information relating to the selected room (e.g., the desired room, the alternate room, or the suggested room), the reservation time, and/or the duration specified by the user. In some implementations, the instruction may include user account information (e.g., a username, a user login, and/or the like) to enable the network storage device to associate the reservation with the user. The roomfinder platform may receive a confirmation of the reservation from the network storage device once the reservation request has been fulfilled, and/or a failure notification if the reservation could not be completed (e.g., if the room was reserved by another user before the reservation could be completed, if the user is not authorized to use the selected room, and/or the like). In such cases, the roomfinder platform may transmit a corresponding notification to the client device, transmit a different reservation option to the user, enable the user to select another room, and/or the like.

As further shown in FIG. 1E, and by reference number 190, the roomfinder platform may cause another action to be performed based on the user selection. In some implementations, the roomfinder platform may store the user selection and/or other feedback received via the client device that may be observed as a user preference. For example, the roomfinder platform may store information relating to a selected room, a time-of-day of the reservation, a duration of the reservation, an attribute of the selected room, a number of times the user selected the room, a user-specified attribute, a room that was rejected by the user, an attribute of a room that was rejected by the user, and/or the like. The roomfinder platform may use such user preference information to enhance the ability to identify an alternate room and/or a suggested room for the user. For example, if scores are used to identify an alternate room and/or a suggested room, the roomfinder platform may add to the score of a room that was previously and/or frequently reserved by the user, and/or deduct from the score of a room that was previously and/or frequently rejected by the user.

In some implementations, the roomfinder platform may use user preference information to enhance a machine learning model (e.g., a machine learning model used for identifying an alternate room and/or a suggested room as described above). For example, the roomfinder platform may input the user preference information as a parameter in training and/or updating the machine learning model. Based on the user preference information, the machine learning model may be trained to identify rooms that the user likes and/or dislikes, and/or identify attributes that the user likes and/or dislikes (e.g., based on common attributes of the rooms the user likes and/or common attributes of the rooms the user dislikes). Using such user preference information, the roomfinder platform may be able to query fewer aspects of the facility data, spend less time in identifying a room for the user, and provide the user with a reservation option having a better likelihood of acceptance. In this way, the roomfinder platform may be able to conserve additional computational and/or network resources in fulfilling a reservation request.

In some implementations, the roomfinder platform may use information relating to the user selection and/or the client data to enhance the ability to identify a desired room specified by the user. For example, the roomfinder platform may input the user selection and/or the client data as a parameter in training the image recognition model and/or the speech recognition model described above. In some cases, the user selection and/or the client data may be used to train the image recognition model to validate or invalidate a prior analysis of image data received from the client device, and use the validation or invalidation to improve the ability to associate different graphical patterns to different rooms. In some cases, the user selection and/or the client data may be used to train the speech recognition model to validate or invalidate a prior analysis of audio data received from the client device, and use the validation or invalidation to improve the ability to associate different audio signal patterns to different rooms. In this way, the roomfinder platform may be able to more accurately identify a desired room in less time and using fewer computational and/or network resources.

In some implementations, the roomfinder platform may generate usage data relating to a plurality of rooms of the facility based on user selections received from a plurality of users and reservation information provided by the facility data. The roomfinder platform may identify a trend in the usage data, and use the trend to generate reservation options that more evenly distribute facility resources and/or identify potential issues with facility resources. For example, a trend in the usage data may identify a room that tends to be unused compared to other similar rooms nearby. The roomfinder platform may provide users with reservation options which encourage use of the unused room, and/or transmit a notification to administrative personnel to investigate if there is an issue with the unused room (e.g., an issue with lighting, audio and/or video equipment, furniture, climate control, and/or the like). In this way, the roomfinder platform may facilitate repairs to facility resources and/or otherwise help optimize use of facility resources.

In some implementations, the roomfinder platform may use the user selection and/or the client data to build a library for an augmented reality (AR) feature. For example, the roomfinder platform may accumulate client data that have been confirmed via user selections (e.g., image data, location data, and/or other available sensor data), and associate the client data with location information provided by the facility data to enable a three-dimensional model of the facility and rooms within the facility. The roomfinder platform may cause a graphical representation of reservation information to be overlaid onto the three-dimensional model in a manner that enables a user using an AR-capable client device to instantly identify a room and/or view an availability of the room using the camera of the client device. In some implementations, the roomfinder platform may enhance the three-dimensional model using another sensory modality. For example, the roomfinder platform may enable an audible message and/or notification to be played through a speaker of the client device when the client device is proximate to and/or directed at a particular room. In this way, the roomfinder platform may be able to help minimize interactions or exchanges with the network storage device, and further conserve computational and/or network resources.

In some implementations, the roomfinder platform may use the user selection and/or the client data to enhance and/or update the facility data. For example, the user selection and/or the client data may indicate an inconsistency within the facility data (e.g., if a room marked as available is under construction and no longer accessible, if a room marked as video-enabled no longer has video capability, and/or the like). The roomfinder platform may confirm the inconsistency using the facility data and cause the network storage device to update the facility data if an inconsistency is identified. In some implementations, the roomfinder platform may track the usage of a room that has been reserved to determine whether the user still needs the room. For example, the roomfinder platform may prompt the user to confirm the reservation before and/or after the reservation time. In some cases, the roomfinder platform may monitor the facility data to determine if the user is an attendee of a meeting in another room, and/or reserved another room for the same reservation time. If the user no longer needs the room, the roomfinder platform may transmit an instruction to the network storage device to cancel the reservation and change the availability status of the room. In this way, the roomfinder platform may be able to further reduce interactions or exchanges with the network storage device, and conserve associated computational and/or network resources.

In some implementations, the roomfinder platform may provide another convenience feature. For example, the roomfinder platform may cause the network storage device to automatically push a calendar event corresponding to a confirmed reservation to a calendar of the user and any other attendee specified by the user. In some cases, the roomfinder platform may cause the client device to provide the user with guidance (e.g., turn-by-turn directions) to a room reserved by the user. In some implementations, the roomfinder platform may cause certain equipment (e.g., network-capable audio equipment, video equipment, telecommunications devices, and/or the like) of a reserved room to be tested prior to the reservation time to ensure that the equipment is working properly, and notify the user and/or administrative personnel if any equipment is not working properly. Additionally, or alternatively, the roomfinder platform may cause certain equipment in the reserved room to turn on or boot up prior to the reservation time, and/or automatically log-in the user, dial-in the user, or dial-out to the user (e.g., to join a call and/or a meeting) prior to or at the reservation time. In some cases, the roomfinder platform may cause certain equipment (e.g., a digital door sign, a monitor, a tablet, a projection device, and/or the like) associated with the reserved room to display and/or update the reservation information (e.g., to display availability status, to display reservation times, to identify the user the room is reserved for, and/or the like).

In this way, the roomfinder platform provides a user with a single resource that can automatically identify a desired room, check availability of the desired room, and reserve the desired room or an alternate room based on the availability. Additionally, or alternatively, the roomfinder platform can automatically identify a suggested room for the user if a desired room was not specified. By leveraging features already built into a smartphone or another mobile device, the roomfinder platform provides a quicker and more convenient way to reserve a room. By automatically managing several steps typically involved in reserving a room, the roomfinder platform conserves computational and/or network resources (e.g., processing resources, memory resources, power resources, communication resources, and/or the like) that would otherwise be used to reserve a room. Also, by leveraging information already available via facility resources, the roomfinder platform can be implemented without requiring additional infrastructure or resources. Furthermore, by acting as the sole intermediary between the user and the facility, the roomfinder can help ensure compliance to corporate policies (e.g., restricting access to certain rooms to certain users, and/or the like).

As indicated above, FIGS. 1A-1E are provided as one or more examples. Other examples may differ from what is described with regard to FIGS. 1A-1E.

Figure 2:
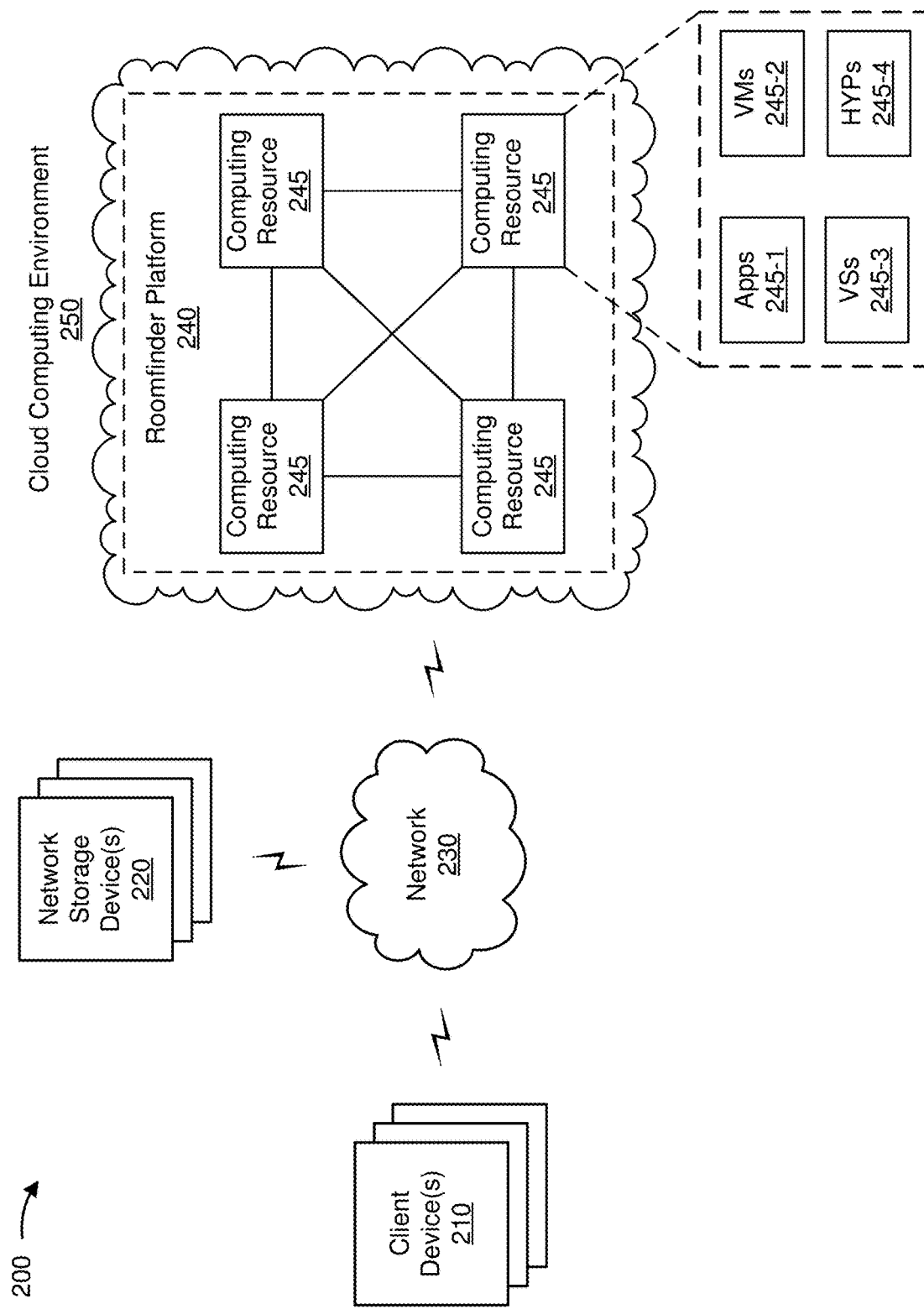
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include one or more client devices 210 (referred to herein individually as client device 210 and collectively as client devices 210), one or more network storage devices 220 (referred to herein individually as network storage device 220 and collectively as network storage devices 220), a network 230, a roomfinder platform 240, a computing resource 245, and a cloud computing environment 250. Devices of environment 200 may interconnect via wired connections, wireless connections, or a combination of wired and wireless connections.

Client device 210 includes one or more devices capable of receiving, generating, storing, processing, and/or providing information, such as client data described herein. For example, client device 210 may include a communication and/or computing device, such as a mobile phone (e.g., a smartphone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Network storage device 220 includes one or more devices capable of storing, processing, and/or routing information. Network storage device 220 may include, for example, a server device, a device that stores a data structure, a device in a cloud computing environment or a data center, a device in a core network of a network operator, a network controller, and/or the like. In some implementations, network storage device 220 may include a communication interface that allows network storage device 220 to receive information from and/or transmit information to other devices in environment 200, such as client device 210, roomfinder platform 240, and/or the like.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Roomfinder platform 240 includes one or more computing devices configured to automatically identify and reserve a room for a user. In some implementations, the roomfinder platform may use client data provided by client device 210 and facility data provided by network storage device 220 to identify a desired room, determine an availability of the desired room or an alternate room if the desired room is unavailable, and reserve the desired room or the alternate room based on a reservation option selected by the user. In some implementations, the roomfinder platform may use client data provided by client device 210 and facility data provided by network storage device 220 to identify and reserve a suggested room based on a reservation option selected by the user. In some implementations, roomfinder platform 240 may be designed to be modular such that certain software components may be swapped in or out depending on a particular need. As such, roomfinder platform 240 may be easily and/or quickly reconfigured for different uses. In some implementations, roomfinder platform 240 may receive information from and/or transmit information to client device 210, network storage device 220, and/or the like.

In some implementations, roomfinder platform 240 may include a server device or a group of server devices. In some implementations, roomfinder platform 240 may be hosted in cloud computing environment 250. Notably, while implementations described herein describe roomfinder platform 240 as being hosted in cloud computing environment 250, In some implementations, roomfinder platform 240 may be non-cloud-based or may be partially cloud-based.

Cloud computing environment 250 includes an environment that delivers computing as a service, whereby shared resources, services, and/or the like may be provided to client device 210, network storage device 220, and/or the like. Cloud computing environment 250 may provide computation, software, data access, storage, and/or other services that do not require end-user knowledge of a physical location and configuration of a system and/or a device that delivers the services. As shown, cloud computing environment 250 may include roomfinder platform 240 and computing resource 245.

Computing resource 245 includes one or more personal computers, workstation computers, server devices, or another type of computation and/or communication device. In some implementations, computing resource 245 may host roomfinder platform 240. The cloud resources may include compute instances executing in computing resource 245, storage devices provided in computing resource 245, data transfer devices provided by computing resource 245, and/or the like. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by client device 210. Application 245-1 may eliminate a need to install and execute the software applications on client device 210. For example, application 245-1 may include software associated with roomfinder platform 240 and/or any other software capable of being provided via cloud computing environment 250. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program and may support a single process. In some implementations, virtual machine 245-2 may execute on behalf of a user (e.g., client device 210), and may manage infrastructure of cloud computing environment 250, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems and may manage the execution of the guest operating systems. Multiple instances of a variety of operating systems may share virtualized hardware resources.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
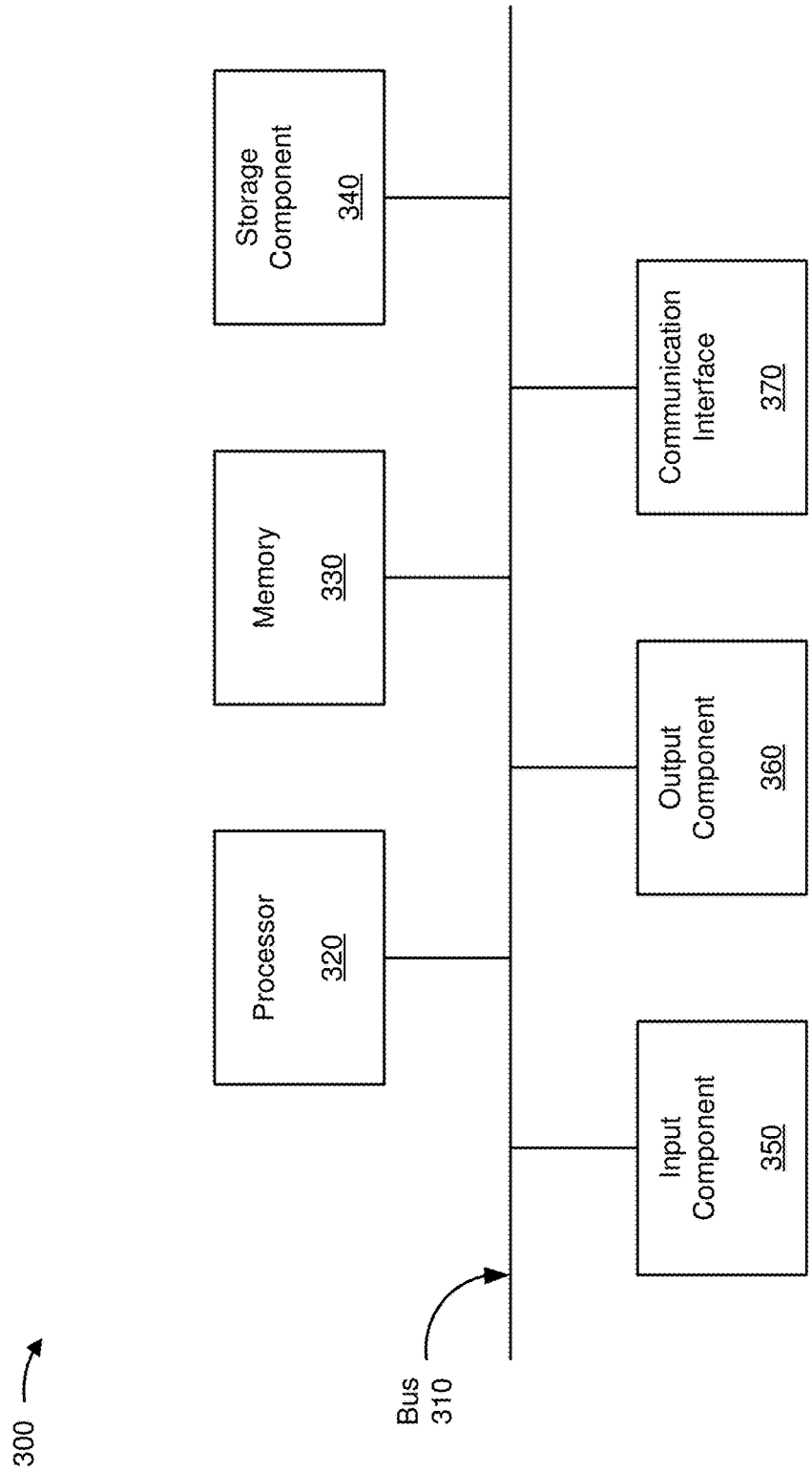
FIG. 3 is a diagram of example components of one or more devices of FIG. 2.

FIG. 3 is a diagram of example components of a device 300. Device 300 may correspond to client device 210, network storage device 220, roomfinder platform 240, and/or computing resource 245. In some implementations, client device 210, network storage device 220, roomfinder platform 240, and/or computing resource 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
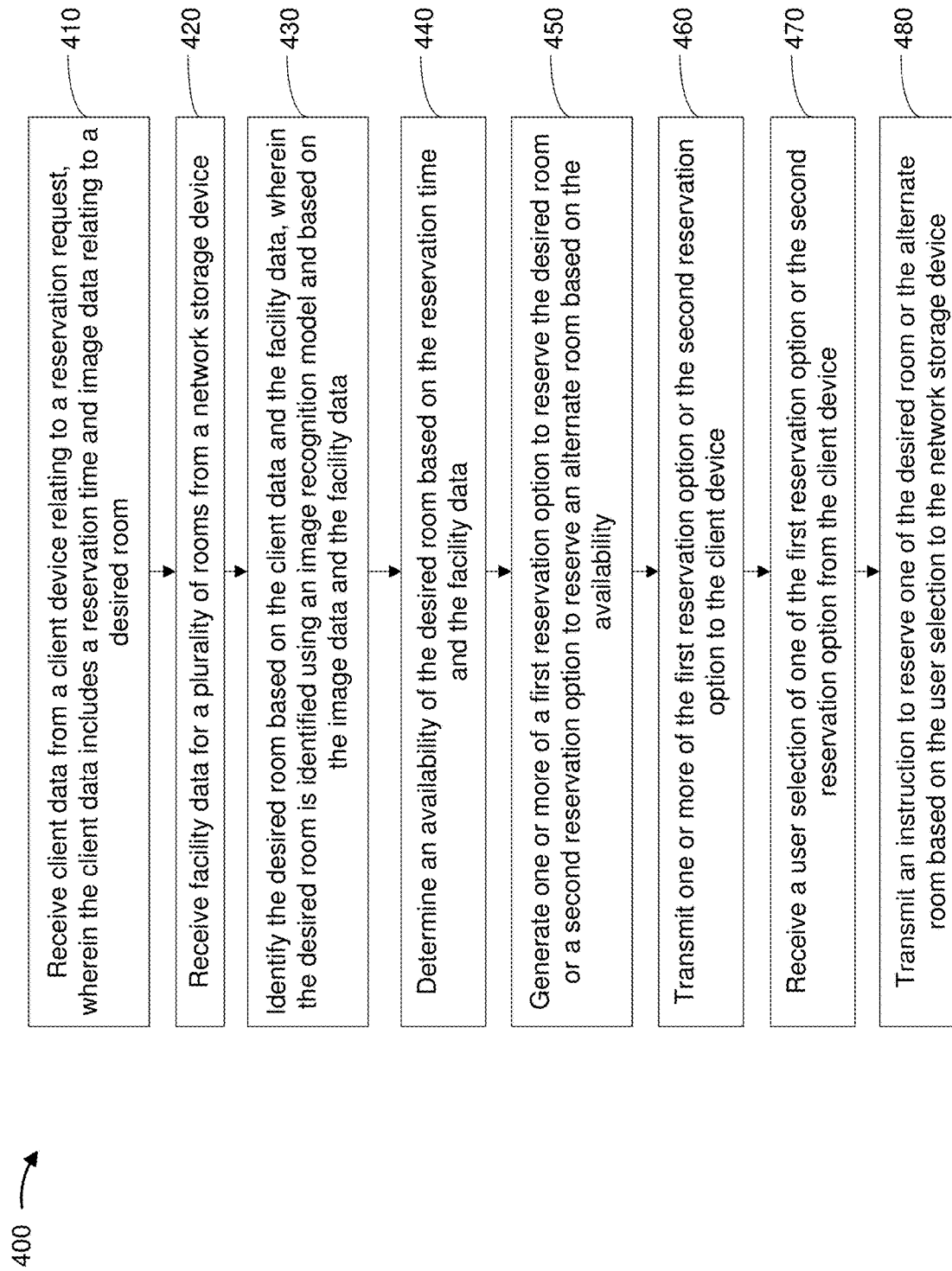
FIG. 4 is a flow chart of an example process for identifying a room.

FIG. 4 is a flow chart of an example process 400 for identifying a room. In some implementations, one or more process blocks of FIG. 4 may be performed by a roomfinder platform (e.g., roomfinder platform 240). In some implementations, one or more process blocks of FIG. 4 may be performed by another device or a group of devices separate from or including the roomfinder platform, such as a client device (e.g., client device 210) or a network storage device (e.g., network storage device 220).

As shown in FIG. 4, process 400 may include receiving client data from a client device relating to a reservation request, wherein the client data includes a reservation time and image data relating to a desired room (block 410). For example, the roomfinder platform (e.g., using a computing resource 245, a processor 320, a memory 330, a storage component 340, an input component 350, a communication interface 370, and/or the like) may receive client data from a client device relating to a reservation request, as described above. In some implementations, the client data may include a reservation time and image data relating to a desired room.

As further shown in FIG. 4, process 400 may include receiving facility data for a plurality of rooms from a network storage device (block 420). For example, the roomfinder platform (e.g., using a computing resource 245, a processor 320, a memory 330, a storage component 340, an input component 350, a communication interface 370, and/or the like) may receive facility data for a plurality of rooms from a network storage device, as described above.

As further shown in FIG. 4, process 400 may include identifying the desired room based on the client data and the facility data, wherein the desired room is identified using an image recognition model and based on the image data and the facility data (block 430). For example, the roomfinder platform (e.g., using a computing resource 245, a processor 320, a memory 330, a storage component 340, and/or the like) may identify the desired room based on the client data and the facility data, as described above. In some implementations, the desired room may be identified using an image recognition model and based on the image data and the facility data.

As further shown in FIG. 4, process 400 may include determining an availability of the desired room based on the reservation time and the facility data (block 440). For example, the roomfinder platform (e.g., using a computing resource 245, a processor 320, a memory 330, a storage component 340, and/or the like) may determine an availability of the desired room based on the reservation time and the facility data, as described above.

As further shown in FIG. 4, process 400 may include generating one or more of a first reservation option to reserve the desired room or a second reservation option to reserve an alternate room based on the availability (block 450). For example, the roomfinder platform (e.g., using a computing resource 245, a processor 320, a memory 330, a storage component 340, and/or the like) may generate one or more of a first reservation option to reserve the desired room or a second reservation option to reserve an alternate room based on the availability, as described above.

As further shown in FIG. 4, process 400 may include transmitting one or more of the first reservation option or the second reservation option to the client device (block 460). For example, the roomfinder platform (e.g., using a computing resource 245, a processor 320, a memory 330, a storage component 340, an output component 360, a communication interface 370, and/or the like) may transmit one or more of the first reservation option or the second reservation option to the client device, as described above.

As further shown in FIG. 4, process 400 may include receiving a user selection of one of the first reservation option or the second reservation option from the client device (block 470). For example, the roomfinder platform (e.g., using a computing resource 245, a processor 320, a memory 330, a storage component 340, an input component 350, a communication interface 370, and/or the like) may receive a user selection of one of the first reservation option or the second reservation option from the client device, as described above.

As further shown in FIG. 4, process 400 may include transmitting an instruction to reserve one of the desired room or the alternate room based on the user selection to the network storage device (block 480). For example, the roomfinder platform (e.g., using a computing resource 245, a processor 320, a memory 330, a storage component 340, an output component 360, a communication interface 370, and/or the like) may transmit an instruction to reserve one of the desired room or the alternate room based on the user selection to the network storage device, as described above.

Process 400 may include additional implementations, such as any single implementation or any combination of implementations described below and/or in connection with one or more other processes described elsewhere herein.

In some implementations, when receiving the client data, the roomfinder platform may receive an image of an attribute of the desired room. In some implementations, when identifying the desired room, the roomfinder platform may identify, using the image recognition model, the desired room based on the image. In some implementations, the image recognition model may be trained to detect a pattern in the image, associate the pattern with one or more of a room number or a room name of the desired room, and identify one or more of the room number or the room name from the plurality of rooms of the facility data.

In some implementations, when determining the availability, the roomfinder platform may determine reservation information of the desired room based on the facility data, and determine the availability of the desired room based on the reservation information corresponding to the reservation time.

In some implementations, when generating one or more of the first reservation option or the second reservation option, the roomfinder platform may generate the second reservation option when the desired room is unavailable for the reservation time.

In some implementations, when generating one or more of the first reservation option or the second reservation option, the roomfinder platform may determine a location of the client device based on the client data, determine reservation information and location information of the plurality of rooms based on the facility data, and identify, using a machine learning model, the alternate room based on the location of the client device, the reservation information, and the location information. In some implementations, the machine learning model may be trained to identify the alternate room from the plurality of rooms based on an availability for the reservation time and a proximity of to the location of the client device.

In some implementations, when generating one or more of the first reservation option or the second reservation option, the roomfinder platform may determine reservation information, location information, and attribute information of the plurality of rooms based on the facility data, and identify, using a machine learning model, the alternate room based on one or more of the reservation information, the location information, or the attribute information. In some implementations, the machine learning model may be trained to identify the alternate room from the plurality of rooms based on one or more of an availability for the reservation time, a proximity to a location of the desired room, or a common attribute with the desired room.

In some implementations, when generating one or more of the first reservation option or the second reservation option, the roomfinder platform may determine attribute information of the plurality of rooms based on the facility data, and identify, using a machine learning model, the alternate room based on the attribute information. In some implementations, the machine learning model may be trained to identify the alternate room from the plurality of rooms based on a common attribute with the desired room. In some implementations, the common attribute may correspond to one or more of room capacity, room equipment, room floor, room location, room layout, or room accessibility.

Although FIG. 4 shows example blocks of process 400, In some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
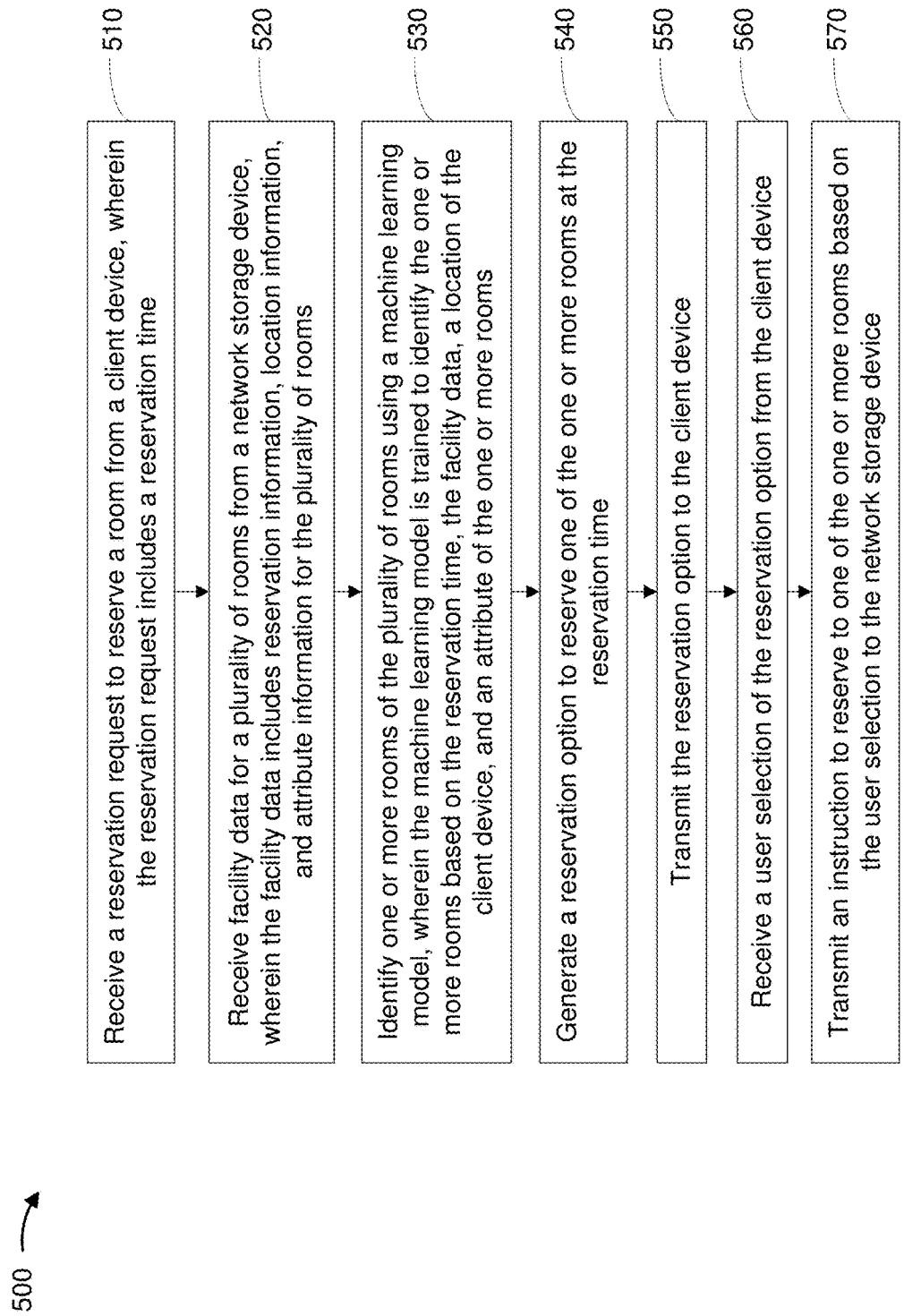
FIG. 5 is a flow chart of an example process for identifying a room.

FIG. 5 is a flow chart of an example process 500 for identifying a room. In some implementations, one or more process blocks of FIG. 5 may be performed by a roomfinder platform (e.g., roomfinder platform 240). In some implementations, one or more process blocks of FIG. 5 may be performed by another device or a group of devices separate from or including the roomfinder platform, such as a client device (e.g., client device 210) or a network storage device (e.g., network storage device 220).

As shown in FIG. 5, process 500 may include receiving a reservation request to reserve a room from a client device, wherein the reservation request includes a reservation time (block 510). For example, the roomfinder platform (e.g., using a computing resource 245, a processor 320, a memory 330, a storage component 340, an input component 350, a communication interface 370, and/or the like) may receive a reservation request to reserve a room, as described above. In some implementations, the reservation request may include a reservation time.

As further shown in FIG. 5, process 500 may include receiving facility data for a plurality of rooms from a network storage device, wherein the facility data includes reservation information, location information, and attribute information for the plurality of rooms (block 520). For example, the roomfinder platform (e.g., using a computing resource 245, a processor 320, a memory 330, a storage component 340, an input component 350, a communication interface 370, and/or the like) may receive facility data for a plurality of rooms from a network storage device, as described above. In some implementations, the facility data may include reservation information, location information, and attribute information for the plurality of rooms.

As further shown in FIG. 5, process 500 may include identifying one or more rooms of the plurality of rooms using a machine learning model, wherein the machine learning model is trained to identify the one or more rooms based on the reservation time, the facility data, a location of the client device, and an attribute of the one or more rooms (block 530). For example, the roomfinder platform (e.g., using a computing resource 245, a processor 320, a memory 330, a storage component 340, and/or the like) may identify one or more rooms of the plurality of rooms using a machine learning model, as described above. In some implementations, the machine learning model may be trained to identify the one or more rooms based on the reservation time, the facility data, a location of the client device, and an attribute of the one or more rooms.

As further shown in FIG. 5, process 500 may include generating a reservation option to reserve one of the one or more rooms at the reservation time (block 540). For example, the roomfinder platform (e.g., using a computing resource 245, a processor 320, a memory 330, a storage component 340, and/or the like) may generate a reservation option to reserve one of the one or more rooms at the reservation time, as described above.

As further shown in FIG. 5, process 500 may include transmitting the reservation option to the client device (block 550). For example, the roomfinder platform (e.g., using a computing resource 245, a processor 320, a memory 330, a storage component 340, an output component 360, a communication interface 370, and/or the like) may transmit the reservation option to the client device, as described above.

As further shown in FIG. 5, process 500 may include receive a user selection of the reservation option from the client device (block 560). For example, the roomfinder platform (e.g., using a computing resource 245, a processor 320, a memory 330, a storage component 340, an input component 350, a communication interface 370, and/or the like) may receive a user selection of the reservation option from the client device, as described above.

As further shown in FIG. 5, process 500 may include transmit an instruction to reserve the one of the one or more rooms based on the user selection to the network storage device (block 570). For example, the roomfinder platform (e.g., using a computing resource 245, a processor 320, a memory 330, a storage component 340, an output component 360, a communication interface 370, and/or the like) may transmit an instruction to reserve the one of the one or more rooms based on the user selection to the network storage device, as described above.

Process 500 may include additional implementations, such as any single implementation or any combination of implementations described below and/or in connection with one or more other processes described elsewhere herein.

In some implementations, when identifying the one or more rooms, the roomfinder platform may identify, using the machine learning model, the one or more rooms based on the reservation information of the one or more rooms. In some implementations, the machine learning model may be trained to identify a plurality of past reservations made by a user of the client device, identify a room frequently reserved by the user, and identify the one or more rooms based on a common attribute with the room frequently reserved by the user.

In some implementations, when identifying the one or more rooms, the roomfinder platform may identify, using the machine learning model, the one or more rooms based on scores. In some implementations, the scores may be indicative of a potential for the one or more rooms to satisfy the reservation request. In some implementations, the machine learning model may be trained to determine the scores based on one or more of a proximity to the location of the client device, a common attribute with a room associated with a past reservation of the user, or a user-specified attribute.

In some implementations, when generating the reservation option, the roomfinder platform may generate a plurality of reservation options for the one or more rooms. In some implementations, the reservation options may be ranked according to scores of the one or more rooms. In some implementations, the scores may be indicative of a potential for the one or more rooms to satisfy the reservation request, and determined based on one or more of a proximity to the location of the client device, a common attribute with a room associated with a past reservation of the user, or a user-specified attribute.

In some implementations, when generating the reservation option, the roomfinder platform may generate a plurality of reservation options to reserve the one or more rooms for different durations.

In some implementations, the roomfinder platform may further update the machine learning model using the user selection. In some implementations, the user selection may include a selection of the reservation option and the one of the one or more rooms by a user of the client device. In some implementations, the machine learning model may be updated based on the facility data, the location of the client device, the attribute of the one or more rooms, and the user selection.

Although FIG. 5 shows example blocks of process 500, In some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
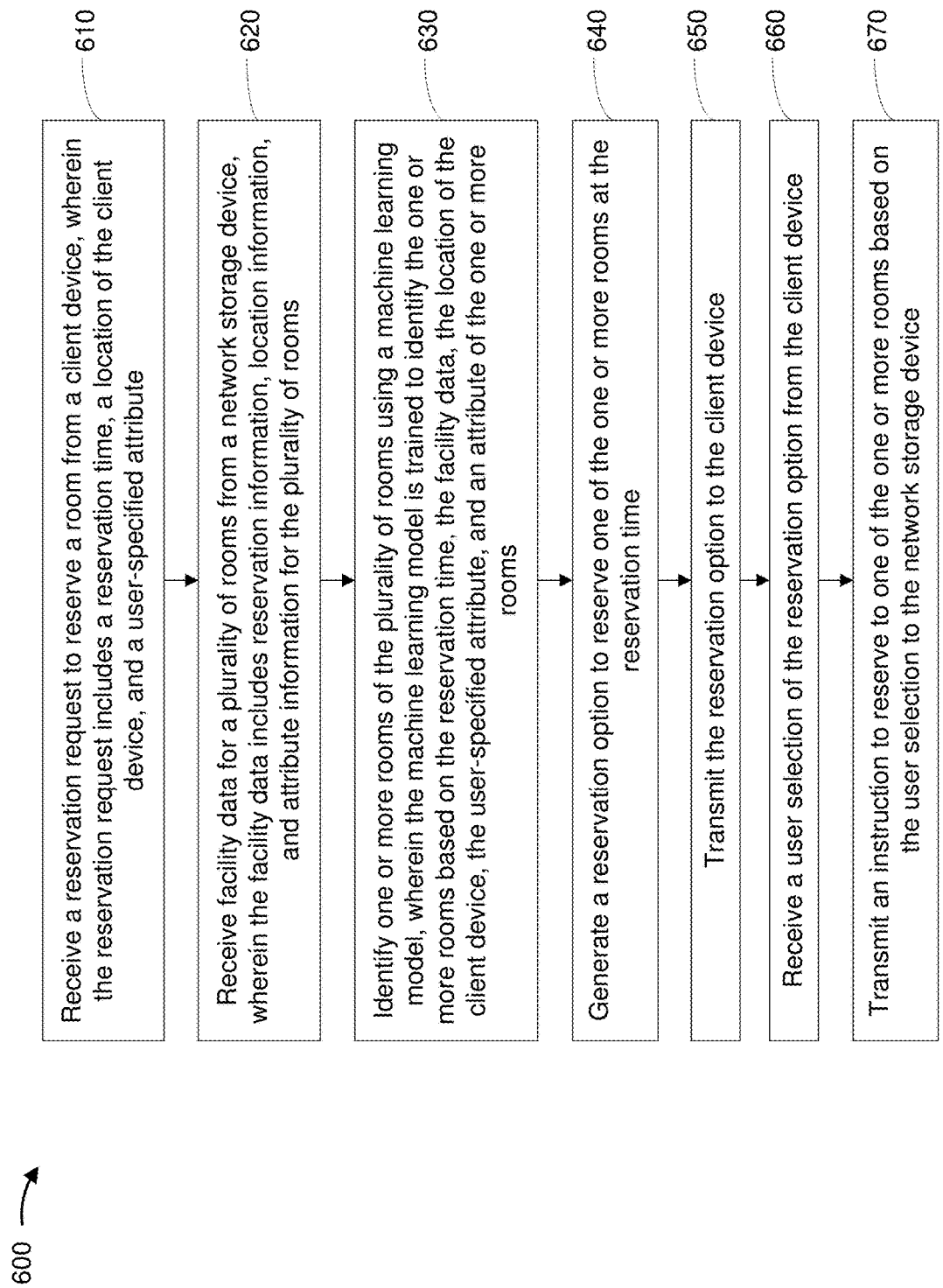
FIG. 6 is a flow chart of an example process for identifying a room.

FIG. 6 is a flow chart of an example process 600 for identifying a room. In some implementations, one or more process blocks of FIG. 6 may be performed by a roomfinder platform (e.g., roomfinder platform 240). In some implementations, one or more process blocks of FIG. 6 may be performed by another device or a group of devices separate from or including the roomfinder platform, such as a client device (e.g., client device 210) or a network storage device (e.g., network storage device 220).

As shown in FIG. 6, process 600 may include receiving a reservation request to reserve a room from a client device, wherein the reservation request includes a reservation time, a location of the client device, and a user-specified attribute (block 610). For example, the roomfinder platform (e.g., using a computing resource 245, a processor 320, a memory 330, a storage component 340, an input component 350, a communication interface 370, and/or the like) may receive a reservation request to reserve a room from a client device, as described above. In some implementations, the reservation request may include a reservation time, a location of the client device, and a user-specified attribute.

As shown in FIG. 6, process 600 may include receiving facility data for a plurality of rooms from a network storage device, wherein the facility data includes reservation information, location information, and attribute information for the plurality of rooms (block 620). For example, the roomfinder platform (e.g., using a computing resource 245, a processor 320, a memory 330, a storage component 340, an input component 350, a communication interface 370, and/or the like) may receive facility data for a plurality of rooms from a network storage device, as described above. In some implementations, the facility data may include reservation information, location information, and attribute information for the plurality of rooms.

As shown in FIG. 6, process 600 may include identifying one or more rooms of the plurality of rooms using a machine learning model, wherein the machine learning model is trained to identify the one or more rooms based on the reservation time, the facility data, the location of the client device, the user-specified attribute, and an attribute of the one or more rooms (block 630). For example, the roomfinder platform (e.g., using a computing resource 245, a processor 320, a memory 330, a storage component 340, and/or the like) may identify one or more rooms of the plurality of rooms using a machine learning model, as described above. In some implementations, the machine learning model may be trained to identify the one or more rooms based on the reservation time, the facility data, the location of the client device, the user-specified attribute, and an attribute of the one or more rooms.

As shown in FIG. 6, process 600 may include generating a reservation option to reserve one of the one or more rooms at the reservation time (block 640). For example, the roomfinder platform (e.g., using a computing resource 245, a processor 320, a memory 330, a storage component 340, and/or the like) may generate a reservation option to reserve one of the one or more rooms at the reservation time, as described above.

As shown in FIG. 6, process 600 may include transmitting the reservation option to the client device (block 650). For example, the roomfinder platform (e.g., using a computing resource 245, a processor 320, a memory 330, a storage component 340, an output component 360, a communication interface 370, and/or the like) may transmit the reservation option to the client device, as described above.

As shown in FIG. 6, process 600 may include receiving a user selection of the reservation option from the client device (block 660). For example, the roomfinder platform (e.g., using a computing resource 245, a processor 320, a memory 330, a storage component 340, an input component 350, a communication interface 370, and/or the like) may receive a user selection of the reservation option from the client device, as described above.

As shown in FIG. 6, process 600 may include transmitting an instruction to reserve the one of the one or more rooms based on the user selection to the network storage device (block 670). For example, the roomfinder platform (e.g., using a computing resource 245, a processor 320, a memory 330, a storage component 340, an output component 360, a communication interface 370, and/or the like) may transmit an instruction to reserve the one of the one or more rooms based on the user selection to the network storage device, as described above.

Process 600 may include additional implementations, such as any single implementation or any combination of implementations described below and/or in connection with one or more other processes described elsewhere herein.

In some implementations, when identifying the one or more rooms, the roomfinder platform may identify, using the machine learning model, the one or more rooms based on the reservation information of the one or more rooms, the location information of the one or more rooms, the attribute information of the one or more rooms, the location of the client device, and the user-specified attribute. In some implementations, the machine learning model may be trained to identify the one or more rooms based on one or more of an availability for the reservation time, a proximity to the location of the client device, or the user-specified attribute.

In some implementations, when identifying the one or more rooms, the roomfinder platform may identify, using the machine learning model, the one or more rooms based on the attribute information. In some implementations, the machine learning model may be trained to identify the one or more rooms based on the user-specified attribute. In some implementations, the user-specified attribute may correspond to one or more of room capacity, room equipment, room floor, room location, room layout, or room accessibility.

In some implementations, when identifying the one or more rooms, the roomfinder platform may identify, using the machine learning model, the one or more rooms based on scores. In some implementations, the scores may be indicative of a potential for the one or more rooms to satisfy the reservation request. In some implementations, the machine learning model may be trained to determine the scores based on one or more of a proximity to the location of the client device or the user-specified attribute.

In some implementations, when generating the reservation option, the roomfinder platform may generate a plurality of reservation options for the one or more rooms. In some implementations, the reservation options may be ranked according to scores of the one or more rooms. In some implementations, the scores may be indicative of a potential for the one or more rooms to satisfy the reservation request, and determined based on one or more of a proximity to the location of the client device or the user-specified attribute.

In some implementations, when generating the reservation option, the roomfinder platform may generate a plurality of reservation options to reserve the one or more rooms for different durations.

In some implementations, the roomfinder platform may further update the machine learning model using the user selection. In some implementations, the user selection may include a selection of the reservation option and the one of the one or more rooms by a user of the client device. In some implementations, the machine learning model may be updated based on the facility data, the location of the client device, the attribute of the one or more rooms, the user-specified attribute, and the user selection.

Although FIG. 6 shows example blocks of process 600, In some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
 receiving, by a device and from a client device within a facility, client data including information associated with a desired room in the facility,
 the client data being one or more of:
  audio data, or
  image data, and the client data further including location data associated with the audio data or the image data,
the location data to correspond to an elevation of the client device to estimate a vertical location of the client device relative to the facility;
receiving, by the device, facility data for a plurality of rooms at the facility;
training, by the device, a recognition model to associate different patterns to different rooms of the plurality of rooms at the facility;
identifying, by the device, using the recognition model, and based on the client data and the facility data, at least one of the desired room or an alternative room based on a plurality of reservation options,
wherein the recognition model is to:
detect a pattern in the client data,
associate the pattern from the client data with an attribute of a room based on an index associating different room attributes with the different rooms,
wherein the attribute identifies room location and
identify at least one of the desired room or the alternative room based on the attribute of the room,
wherein identifying, at least one of the desired room or the alternative room comprises:
generating, by the device, the plurality of reservation options for one or more rooms,
wherein the plurality of reservation options are ranked based on a potential for the one or more rooms to satisfy a reservation request; and
transmitting, by the device, an instruction to reserve one of the desired room or the alternative room based on identifying at least one of the desired room or the alternative room.

2. The method of claim 1, wherein the client data is the audio data, and
wherein training the recognition model comprises:
training a speech recognition model to validate or invalidate a prior analysis of the audio data received from the client device.

3. The method of claim 1, further comprising:
generating one or more of a first reservation option to reserve the desired room or a second reservation option to reserve the alternate room;
transmitting one or more of the first reservation option or the second reservation option;
receiving a user selection of one of the first reservation option or the second reservation option; and
wherein transmitting the instruction to reserve comprises:
transmitting the instruction to reserve one of the desired room or the alternate room based on the user selection.

4. The method of claim 1, wherein:
the location data is determined via a location sensor of the client device.

5. The method of claim 1, the audio data corresponding to audio captured via a microphone of the client device and include audio corresponding to one or more of:
a room number,
a room name, or
another room identifier associated with the desired room.

6. The method of claim 1, wherein the client data further includes a reservation time; and
the method further comprises:
determining an availability of the desired room based on the reservation time and the facility data; and
wherein transmitting the instruction to reserve comprises:
transmitting the instruction to reserve the desired room based on the desired room being available.

7. The method of claim 1, wherein the client data further includes a reservation time; and
the method further comprising:
determining an availability of the desired room based on the reservation time and the facility data; and
wherein transmitting the instruction to reserve comprises:
transmitting the instruction to reserve the alternate room based on the desired room being unavailable.

8. A device, comprising:
one or more memories; and
one or more processors, communicatively coupled to the one or more memories, to:
receive, from a client device within a facility, client data including information associated with a desired room in the facility,
the client data being one or more of:
audio data, or
image data, and
the client data further including location data associated with the audio data or the image data,
the location data to correspond to an elevation of the client device to estimate a vertical location of the client device relative to the facility;
receive facility data for a plurality of rooms at the facility;
train a recognition model to associate different patterns to different rooms of the plurality of rooms at the facility;
identify, using the recognition model, and based on the client data and the facility data, at least one of the desired room or an alternative room based on a plurality of reservation options,
wherein the recognition model is to:
associate a pattern from the client data with an attribute of a room based on an index associating different room attributes with the different rooms,
wherein the attribute identifies room location, and
identify at least one of the desired room or the alternative room based on the attribute of the room,
wherein the one or more processors, when identifying at least one of the desired room or the alternative room, are to:
generate the plurality of reservation options for one or more rooms,
wherein the plurality of reservation options are ranked based on a potential for the one or more rooms to satisfy a reservation request; and
transmit an instruction to reserve one of the desired room or the alternative room based on identifying at least one of the desired room or the alternative room.

9. The device of claim 8, wherein the client data is the audio data, and
wherein the one or more processors, when training the recognition model, are to:
train a speech recognition model to validate or invalidate a prior analysis of the audio data received from the client device.

10. The device of claim 8,
wherein the reservation options are further ranked according to scores of the one or more rooms, and
wherein the scores are indicative of a potential for the one or more rooms to satisfy a reservation request, and determined based on one or more of a proximity to a location of the client device, a common attribute with a room associated with a past reservation of a user, or a user-specified attribute.

11. The device of claim 8, wherein:
the location data is determined via a location sensor of the client device.

12. The device of claim 8, wherein the facility data includes one or more of:
reservation information,
location information, and
attribute information for the plurality of rooms.

13. The device of claim 8, wherein the client data further includes a reservation time; and
wherein the one or more processors are further to:
determine an availability of the desired room based on the reservation time and the facility data; and
wherein the one or more processors, when transmitting the instruction to reserve, are to:
transmit the instruction to reserve the desired room based on the desired room being available.

14. The device of claim 8, wherein the client data further includes a reservation time; and
wherein the one or more processors are further to:
determine an availability of the desired room based on the reservation time and the facility data; and
wherein the one or more processors, when transmitting the instruction to reserve, are to:
transmit the instruction to reserve the alternate room based on the desired room being unavailable.

15. A non-transitory computer-readable medium storing instructions, the instructions comprising:
one or more instructions that, when executed by one or more processors, cause the one or more processors to:
receive, from a client device within a facility, client data including information associated with a desired room in the facility,
the client data further including location data,
wherein the location data corresponds to an elevation of the client device to estimate a vertical location of the client device relative to the facility;
receive facility data for a plurality of rooms at the facility;
train a recognition model to associate different patterns to different rooms of the plurality of rooms at the facility;
identify using the recognition model, and based on the client data and the facility data, at least one of the desired room or an alternative room based on a plurality of reservation options,
wherein the recognition model is to:
detect a pattern in the client data,
associate the pattern in the client data with an attribute of a room based on an index associating different room attributes with the different rooms,
wherein the attribute identifies room location, and
identify at least one of the desired room or the alternative room based on the attribute of the room,
wherein the one or more instructions, that cause the one or more processors to identify at least one of the desired room or the alternative room, cause the one or more processors to:
generate the plurality of reservation options for one or more rooms,
wherein the plurality of reservation options are ranked based on a potential for the one or more rooms to satisfy a reservation request; and
transmit an instruction to reserve one of the desired room or the alternative room based on identifying at least one of the desired room or the alternative room.

16. The non-transitory computer-readable medium of claim 15, wherein the one or more instructions, when executed by the one or more processors, further cause the one or more processors to:
generate one or more of a first reservation option to reserve the desired room or a second reservation option to reserve the alternate room;
transmit one or more of the first reservation option or the second reservation option; and
receive a user selection of one of the first reservation option or the second reservation option; and
wherein the one or more instructions, that cause the one or more processors to transmit the instruction to reserve, cause the one or more processors to:
transmit the instruction to reserve one of the desired room or the alternate room based on the user selection.

17. The non-transitory computer-readable medium of claim 15, wherein the client data is audio data, and
wherein the one or more instructions, that cause the one or more processors to train the recognition model, cause the one or more processors to:
train a speech recognition model to validate or invalidate a prior analysis of audio data received from the client device.

18. The non-transitory computer-readable medium of claim 15, the client data includes audio data corresponding to audio captured via a microphone of the client device and include audio corresponding to one or more of:
a room number,
a room name, or
another room identifier associated with the desired room.

19. The non-transitory computer-readable medium of claim 15, wherein the client data further includes a reservation time; and
wherein the one or more instructions, when executed by the one or more processors, further cause the one or more processors to:
determine an availability of the desired room based on the reservation time and the facility data; and
wherein the one or more instructions, that cause the one or more processors to transmit the instruction to reserve, cause the one or more processors to:
transmit the instruction to reserve the desired room based on the desired room being available.

20. The non-transitory computer-readable medium of claim 15, wherein the client data further includes a reservation time; and
wherein the one or more instructions, when executed by the one or more processors, further cause the one or more processors to:
determine an availability of the desired room based on the reservation time and the facility data; and
wherein the one or more instructions, that cause the one or more processors to transmit the instruction to reserve, cause the one or more processors to:
transmit the instruction to reserve the alternate room based on the desired room being unavailable.

* * * * *